(12) United States Patent
Weyrich et al.

(10) Patent No.: US 8,091,917 B2
(45) Date of Patent: Jan. 10, 2012

(54) AIRBAG DEVICE FOR PROTECTING A VEHICLE OCCUPANT

(75) Inventors: Christian Weyrich, Elchingen (DE); Stefan Schäfer, Erbach (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/662,613

(22) Filed: Apr. 26, 2010

(65) Prior Publication Data

US 2010/0207367 A1   Aug. 19, 2010

Related U.S. Application Data

(63) Continuation of application No. PCT/EP2008/064726, filed on Oct. 30, 2008.

(30) Foreign Application Priority Data

Oct. 30, 2007   (DE) ............... 20 2007 015 431 U

(51) Int. Cl.
B60R 21/20 (2011.01)

(52) U.S. Cl. .................. 280/728.2; 280/730.2

(58) Field of Classification Search ........... 280/728.1, 280/728.2, 730.1, 730.2
See application file for complete search history.

(56) References Cited

U.S. PATENT DOCUMENTS

| | | | |
|---|---|---|---|
| 5,498,023 A * | 3/1996 | Adams et al. | 280/728.2 |
| 6,273,456 B1 * | 8/2001 | Heigl | 280/730.2 |
| 6,338,498 B1 * | 1/2002 | Niederman et al. | 280/728.2 |
| 6,450,529 B1 * | 9/2002 | Kalandek et al. | 280/730.2 |
| 6,481,743 B1 * | 11/2002 | Tobe et al. | 280/728.2 |
| 6,530,595 B2 * | 3/2003 | Masuda et al. | 280/730.2 |
| 6,630,220 B1 * | 10/2003 | Veiga | 428/102 |
| 6,846,010 B2 * | 1/2005 | Enders | 280/730.2 |
| 6,883,827 B2 * | 4/2005 | Keshavaraj | 280/730.2 |
| 6,991,255 B2 * | 1/2006 | Henderson et al. | 280/730.2 |
| 7,144,038 B2 * | 12/2006 | Keshavaraj | 280/743.1 |
| 7,198,293 B2 * | 4/2007 | Olson | 280/743.1 |
| 7,261,316 B1 | 8/2007 | Salmo et al. | |
| 7,357,408 B2 * | 4/2008 | Hall et al. | 280/728.2 |
| 7,469,923 B2 * | 12/2008 | Ryan et al. | 280/730.2 |
| 7,556,286 B2 * | 7/2009 | Powals | 280/730.2 |
| 7,658,402 B2 * | 2/2010 | Ohba | 280/730.2 |
| 7,766,369 B2 * | 8/2010 | Bradburn et al. | 280/728.2 |
| 2002/0167153 A1 | 11/2002 | Kippschull | |
| 2003/0011175 A1 * | 1/2003 | Hess et al. | 280/730.2 |
| 2003/0057683 A1 * | 3/2003 | Wipasuramonton et al. | 280/730.2 |

(Continued)

FOREIGN PATENT DOCUMENTS

DE    101 22 838 B4   12/2002

(Continued)

*Primary Examiner* — Eric Culbreth
*Assistant Examiner* — Barry Gooden, Jr.
(74) *Attorney, Agent, or Firm* — Foley & Lardner LLP

(57) ABSTRACT

An airbag device for protecting a vehicle occupant in case of a crash, including at least one region that can be inflated with gas, which in the inflated state forms a gas cushion for a vehicle occupant to be protected in the form of a side airbag, at least a first material layer of the inflatable region extending in front of a lateral vehicle structure of a motor vehicle in the inflated state of the airbag device, and at least a second material layer of the inflatable region of the inflatable region, that opposes the first material layer in the inflated state of the airbag device, wherein at least one fastening flap is provided at the airbag device via which the airbag device can be fastened to a motor vehicle structure.

18 Claims, 15 Drawing Sheets

U.S. PATENT DOCUMENTS

| | | | |
|---|---|---|---|
| 2003/0141708 A1* | 7/2003 | Enders | 280/730.2 |
| 2003/0160434 A1* | 8/2003 | Uchiyama et al. | 280/730.2 |
| 2003/0178820 A1* | 9/2003 | Green et al. | 280/730.2 |
| 2003/0205888 A1* | 11/2003 | Keshavaraj | 280/730.2 |
| 2005/0104335 A1* | 5/2005 | Henderson et al. | 280/728.2 |
| 2005/0156413 A1* | 7/2005 | Olson | 280/730.2 |
| 2005/0285378 A1* | 12/2005 | Noguchi et al. | 280/730.2 |
| 2006/0033318 A1* | 2/2006 | Ryan et al. | 280/743.1 |
| 2006/0061075 A1* | 3/2006 | Aoki et al. | 280/730.2 |
| 2006/0192368 A1* | 8/2006 | Hall et al. | 280/730.2 |
| 2007/0024031 A1* | 2/2007 | Coleman | 280/728.2 |
| 2007/0158931 A1 | 7/2007 | Baumgartner et al. | |
| 2007/0164543 A1* | 7/2007 | Fukuda et al. | 280/729 |
| 2007/0273128 A1* | 11/2007 | Cheal | 280/728.2 |
| 2007/0296188 A1* | 12/2007 | Breuninger | 280/730.2 |
| 2008/0284142 A1* | 11/2008 | Cheal et al. | 280/730.2 |
| 2009/0026742 A1* | 1/2009 | Noguchi et al. | 280/730.2 |
| 2009/0058053 A1* | 3/2009 | Osterhout et al. | 280/730.2 |
| 2009/0079172 A1* | 3/2009 | Messner et al. | 280/730.2 |
| 2009/0167007 A1* | 7/2009 | Schindzielorz et al. | 280/743.1 |
| 2009/0212542 A1* | 8/2009 | Toda et al. | 280/730.2 |
| 2010/0117343 A1* | 5/2010 | Hoffman et al. | 280/730.2 |
| 2010/0133795 A1* | 6/2010 | Fukuda et al. | 280/730.2 |
| 2010/0207367 A1* | 8/2010 | Weyrich et al. | 280/730.2 |

FOREIGN PATENT DOCUMENTS

| | | |
|---|---|---|
| DE | 20 2006 000 846 U1 | 4/2006 |
| EP | 1 397 240 B1 | 3/2004 |
| EP | 1 464 549 A1 | 10/2004 |
| EP | 1 501 707 B1 | 2/2005 |
| WO | WO 01/89884 A1 | 11/2001 |
| WO | WO 2007/062847 A1 | 6/2007 |

* cited by examiner

FIG 1
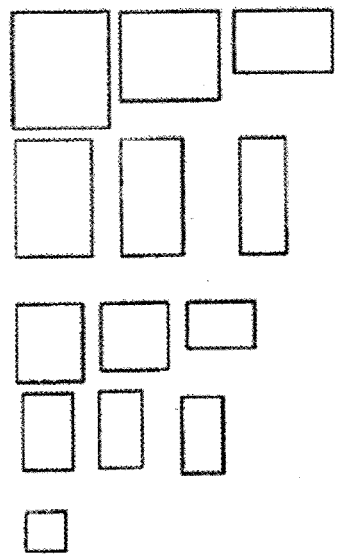
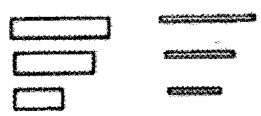
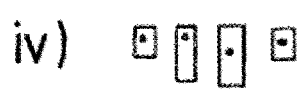
FIG 2
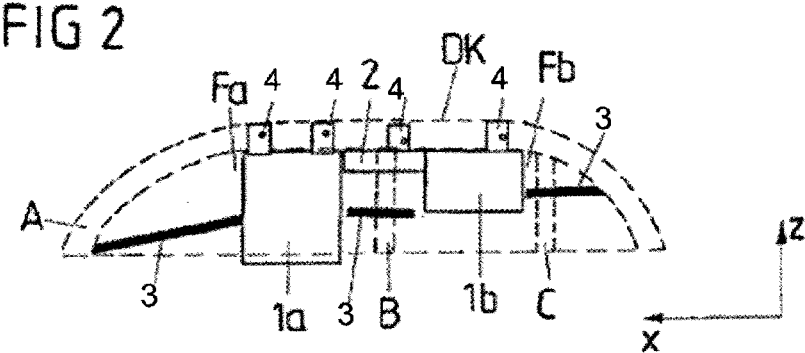

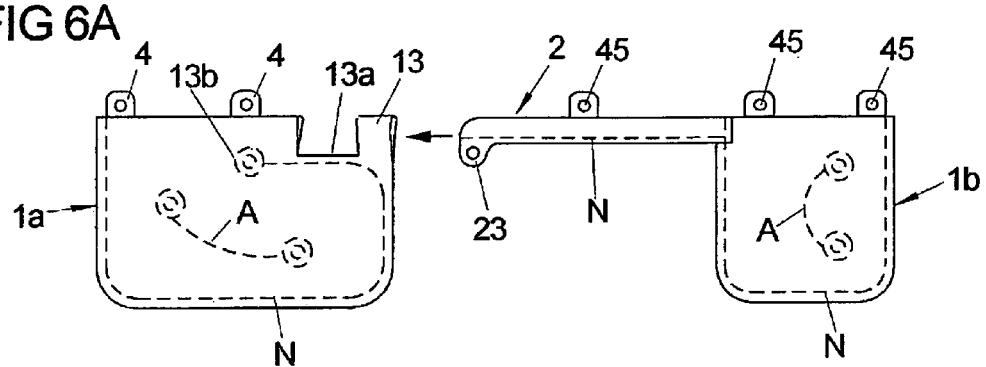
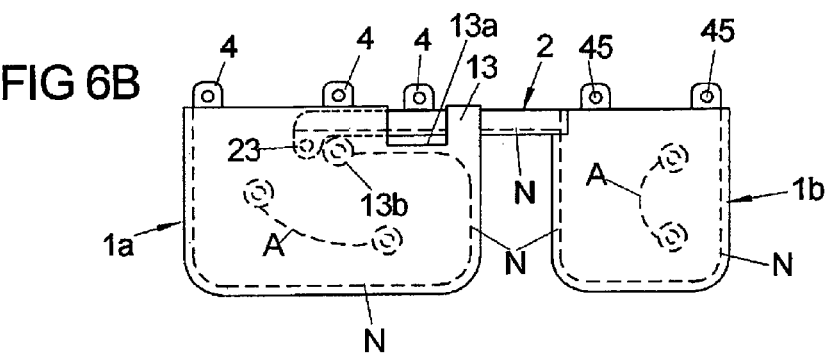
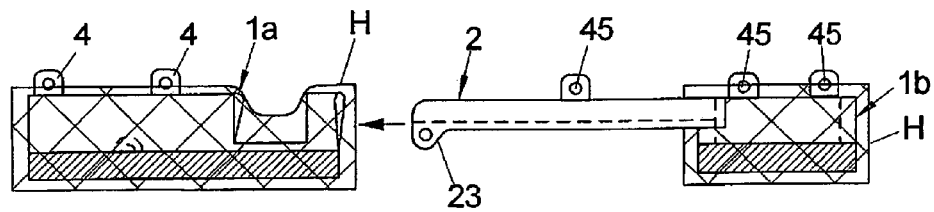
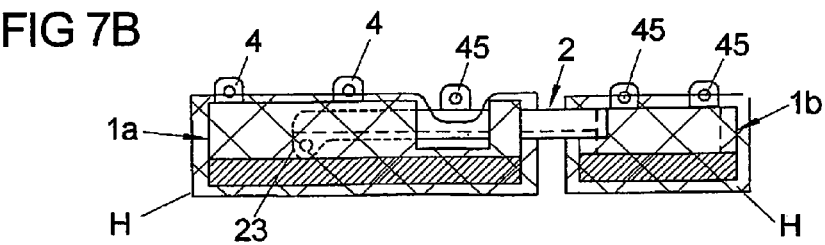

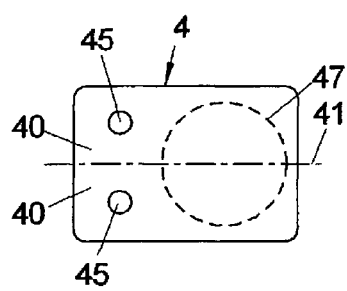
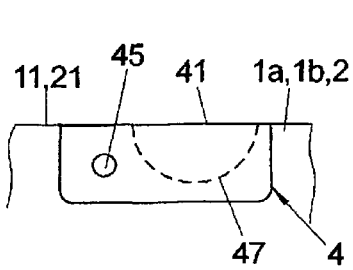
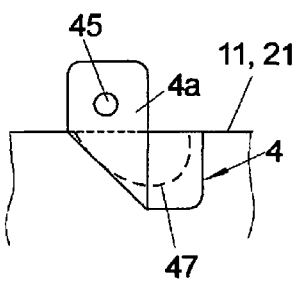
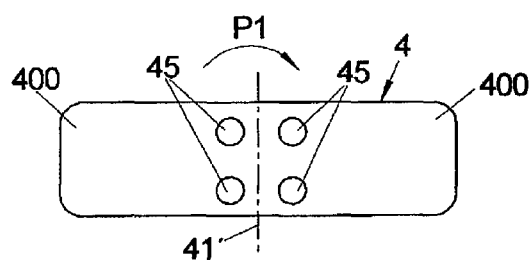
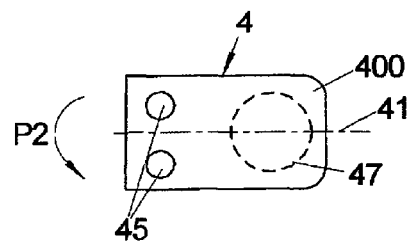
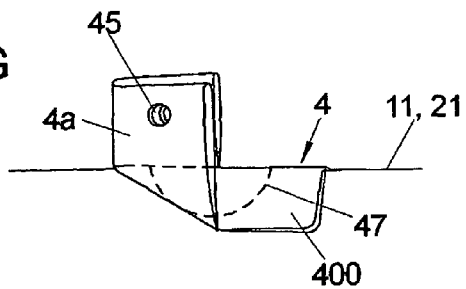

FIG 11C (1)
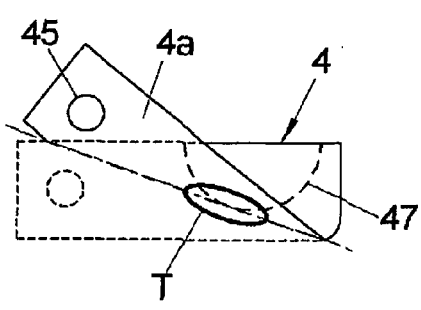
FIG 11C (2)
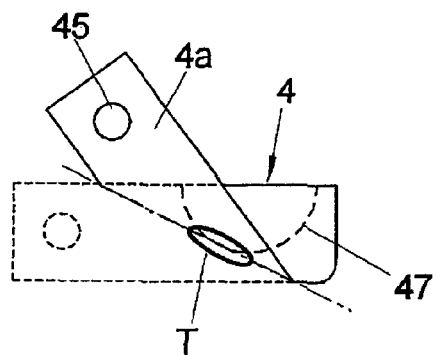
FIG 11C (3)
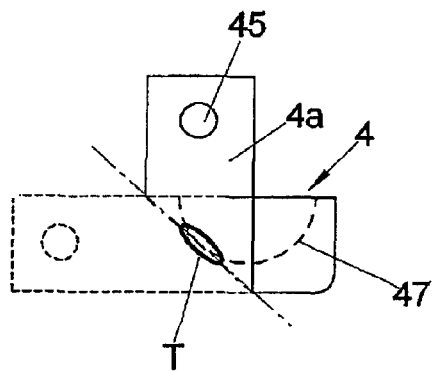
FIG 11C (4)
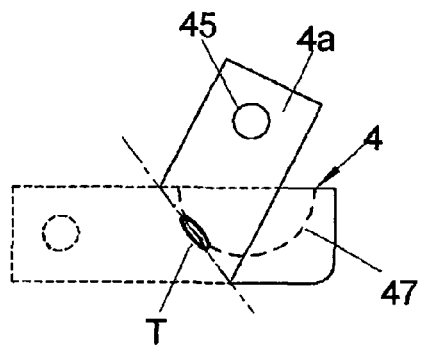
FIG 11C (5)
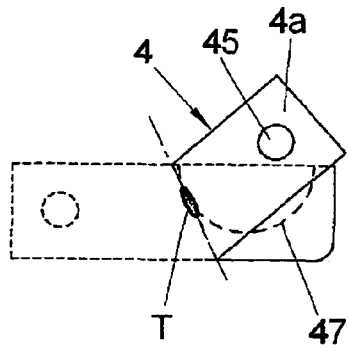

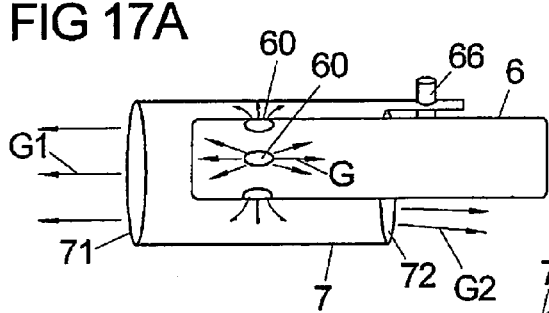
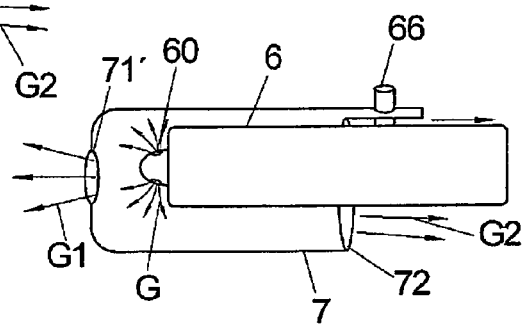
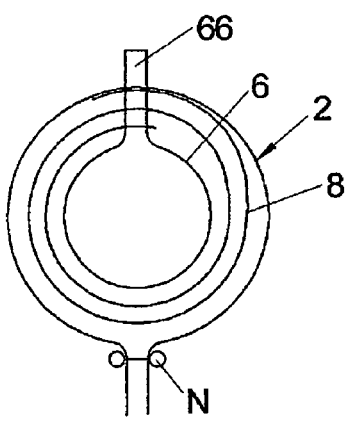
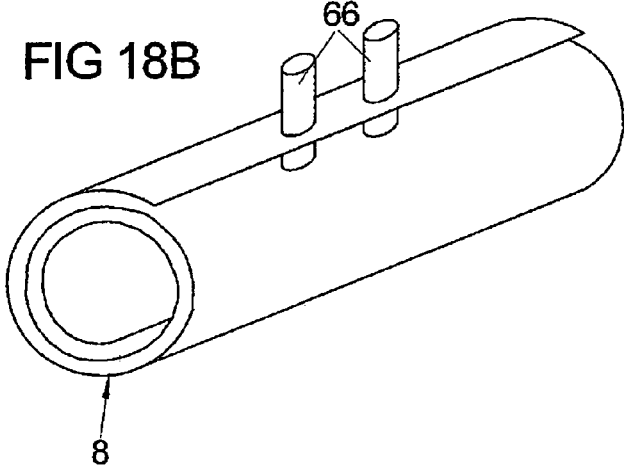
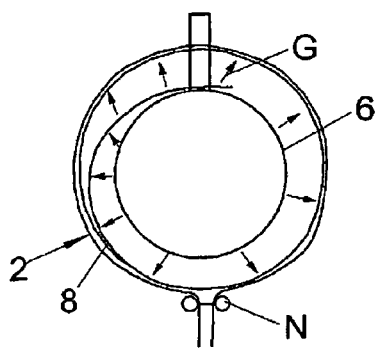
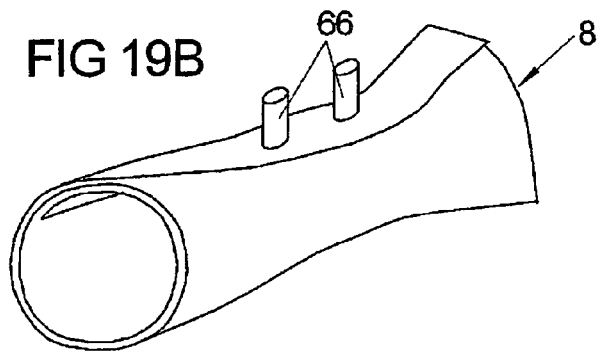

AIRBAG DEVICE FOR PROTECTING A VEHICLE OCCUPANT

CROSS-REFERENCE TO RELATED PATENT APPLICATIONS

This application is a continuation of International Application PCT/EP2008/064726, which has an international filing date of Oct. 30, 2008; this international Application was not published in English, but was published in German on May 5, 2009 as WO 2009/056595. The foregoing application is incorporated herein by reference in its entirety.

BACKGROUND

The invention relates to an airbag device for protecting a vehicle occupant.

Such an airbag device in the form of a side airbag device particularly serves for protecting the upper part of the body and/or the head of a vehicle occupant, as in the case of a crash, for instance in case of a side impact, a collision of the upper body/head and the lateral vehicle structure, e.g. window pane of a motor vehicle or a lateral pillar or a door rail of the vehicle structure and/or with an object intruding into the vehicle, is prevented. For this, the airbag device comprises at least one region inflatable with gas, that forms in the inflated state a gas cushion for a vehicle occupant to be protected, wherein the inflatable region comprises a first material layer (airbag layer), that extends—with respect to a state of the airbag device in which the airbag device is inflated and built into a motor vehicle—in front of a lateral vehicle structure, e.g. in front of a lateral window pane of a motor vehicle, as well as a second material layer (airbag layer), that opposes the first airbag layer in the inflated state of the airbag device, and thus faces e.g. the vehicle interior space and therewith the upper body/head of a vehicle occupant to be protected.

Such side protection devices for vehicle occupants on the basis of an airbag device are generally known. In an embodiment, such a side airbag device serves as a head protection device not only for protecting the head of a single vehicle occupant that resides on a front seat of a motor vehicle for instance, but moreover (at the same time) for protecting several vehicle occupants, particularly two occupants sitting one after the other, as the head protection device in the form of an airbag device does not only extend in front of a front side pane, but also in front of a rear side pane of a motor vehicle, for instance along the vehicle longitudinal direction from the so-called A-pillar via the B-pillar to the C-pillar or D-pillar of a motor vehicle, see WO 2001/089884 A1.

Thereby, not only head protection devices are addressed at hand, but more generally also side protection devices in the form of an airbag device that can be fastened to a lateral vehicle body, e.g., to a roof frame, to a vehicle door or to a vehicle seat. Such airbag devices are also generally denoted as side airbags.

Especially in the case of an airbag device that is configured as side airbag for protecting the head of a vehicle occupant, i.e. as a so-called head side airbag, usually at least one inflatable region of the airbag device extends in front of a lateral window pane.

It would be advantageous to further improve an airbag device of the kind mentioned in the beginning.

SUMMARY

One disclosed embodiment relates to an airbag device for protecting a vehicle occupant in case of a crash. According thereto, for fastening the airbag device to a vehicle body, particularly to the roof edge region or to a (door) rail region of the vehicle body or to a vehicle seat or also to a supporting component of the airbag device, fastening flaps (consisting out of a flexible material) protrude from the airbag device, which are provided here particularly as separate flaps on the airbag device, particularly on a gas sack region, and are fixed there via connection lines, e.g. by seams and/or gluing means.

It is to be understood that both the foregoing general description and the following detailed description are exemplary and explanatory only, and are not restrictive of the invention as claimed.

BRIEF DESCRIPTION OF THE DRAWINGS

These and other features, further details, aspects and advantages of the present invention are clarified by means of the following description, appended claims and the accompanying exemplary description of embodiments of the invention on the basis of the Figures.

FIG. 1 shows a schematic illustration of single components of a construction kit, from which an airbag device for protecting the head of a vehicle occupant can be combined;

FIG. 2 shows an example of an airbag device combined from components according to FIG. 1;

FIG. 4b shows an airbag device serving as a head protection out of the components of FIG. 4a;

FIG. 5b shows an airbag device serving as a head protection out of the components of FIG. 5a;

FIG. 6a shows two modules of an airbag device serving as a head protection device, which can be stuck together;

FIG. 6b shows the modules of FIG. 6a in a state in which the latter are stuck together;

FIG. 7a shows a modification of the arrangement shown in FIG. 6a;

FIG. 7b shows a modification of the arrangement shown in FIG. 6b;

FIG. 10d-10e show two variants of the embodiment according to FIGS. 10a to 10c on the basis of the illustration according to FIG. 10a;

FIG. 11a-11c show a first modification of the embodiment according to FIGS. 10a to 10c;

FIG. 11d-11g show a variant of the embodiment according to FIGS. 11a to 11c;

FIG. 11c(1)-11c(5) show the arrangement of FIG. 11c in case of different loads with external forces;

FIG. 17a shows a first embodiment of a barrel-shaped gas stream distributor for partitioning the gas stream leaving a gas generator of the airbag device;

FIG. 17b shows a second embodiment of a barrel-shaped gas stream distributor for partitioning the gas stream leaving a gas generator of the airbag device;

FIG. 18a-18b shows a first embodiment of a wrapped protection layer for protecting the fabric of a connection channel of the airbag device against hot gases streaming out of a gas generator;

FIG. 19a-19b show the arrangement according to FIGS. 18a and 18b after discharging gas out of the gas generator;

DESCRIPTION

Figure 3:
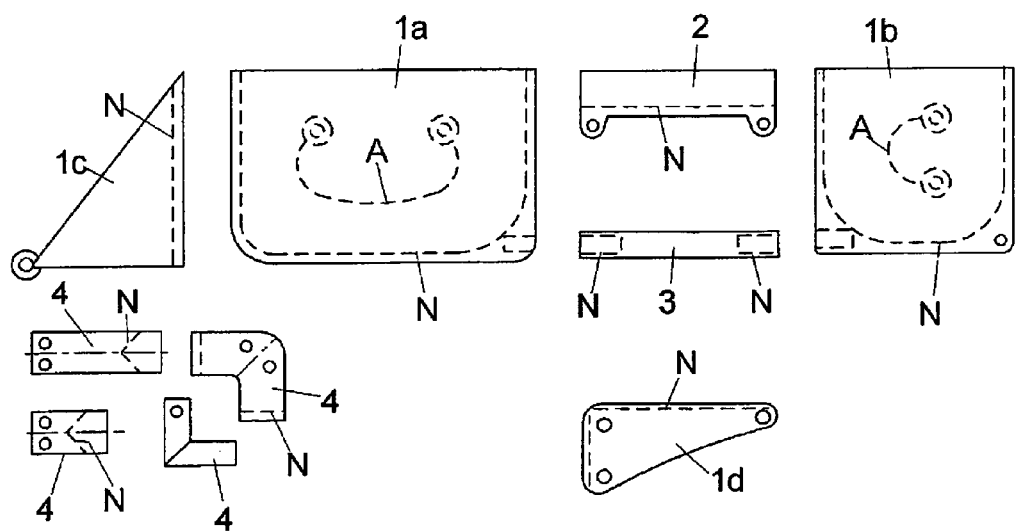
FIG. 3 shows a detailed illustration of components of an airbag device, which can be combined for forming a head protection device.

One disclosed embodiment of the invention relates to an airbag device for protecting a vehicle occupant in case of a crash. According thereto, for fastening the airbag device to a vehicle body, particularly to the roof edge region or to a (door) rail region of the vehicle body or to a vehicle seat or also to a supporting component of the airbag device, fastening flaps (consisting out of a flexible material) protrude from the airbag device, which are provided here particularly as separate flaps on the airbag device, particularly on a gas sack region, and are fixed there via connection lines, e.g. by seams and/or gluing means.

Thereby, the fastening flaps comprise as multiple-layer fastening flaps at least two layers from which each one is fixed to each of the two material layers of the associated inflatable gas sack region via a connection line. Further, the layers of the fastening flap are folded with an end portion provided as a fastening portion around the associated connection line, respectively, so that the fastening portion protrudes beyond the airbag device and serves for fastening the airbag device to a motor vehicle structure.

Due to the use of flexible flaps (consisting out of a flexible material) for coupling the airbag device to a motor vehicle structure (more precisely to a respective connection locations of the vehicle structure) displacements of components of the airbag device triggered by (crash-caused) external forces as well as geometrical changes of the airbag device occurring due to inflation of inflatable regions of the airbag device, can be compensated. Further, the occurrence of local force peaks in case of a force introduction between a respective fastening flap and an associated region of the airbag device can be prevented by achieving a sufficient large-area force introduction as well as a force introduction along several directions by suitably forming the connection locations between a respective fastening flap and an associated component of an airbag device (e.g. by using curved connection locations/seams).

The fastening portion of a respective fastening flap can thereby move relative to the airbag device, particularly under impact of a force, e.g. upon inflation of the airbag device, so that the angle of the force introduction between the vehicle structure and the airbag device is variably adapted to the respective force relations (via the respective fastening flap) and particularly allows for force introductions from different directions, depending on the force actions in the individual case.

Thereby, the fastening flaps are particularly to be arranged such that the respective fastening portion that is formed by reverting an end portion of the respective fastening flap around a connection line and via which the respective fastening flap is attached to the vehicle structure, essentially moves in each case in a plane upon external impact of a force (caused by inflating the airbag device), namely in a plane, that forms the main extension plane of the associated airbag device, or to be more precise, of the inflatable region of the airbag device associated to the respective fastening flap.

Thereby, the fastening portions particularly protrude towards the vehicle structure beyond a lateral edge or a lateral boundary of the airbag device (or more precisely, of the inflatable region associated to the respective fastening flap), so that fastening said fastening portions to the vehicle structure is eased.

Thereby, the fastening flaps are each formed by at least one material layout being separate with respect to the remaining components of the airbag device, particularly with respect to the associated inflatable region, which material layout is fixed to the airbag device via said connection lines.

According to a further development of the invention, the two airbag layers of an inflatable region of the airbag device each form a component of an airbag part being formed in one piece (material layout), particularly in the form of a fabric part or a film part, that is reverted along at least one folding line, so that the two airbag layers oppose each other, wherein the two airbag layers are fastened to one another outside the folding line, for instance by sewing, weaving or gluing, in a way, that they define an inflatable region of an airbag device that can be inflated to form a gas cushion.

The same holds for the two- or more than two-layer fastening flaps, which also advantageously consist out of a single material layout (or material part) formed in one piece, which is at least folded once (about a folding line) for forming a two-layer or more than two-layer fastening flap.

Forming the two airbag layers or layers of a fastening flap in one piece thereby means, that the two airbag layers/layers of a fastening flap each directly form a component of a unique material part/material layout, without the necessity of additional connection means, like for instance seams or gluing means in order to keep the two layers together (wherein however seams or the like can be provided so as to provide for additional connection locations between said layers or to further components). In the case of an airbag part being formed as a fabric part, the two airbag layers, in the form of a fabric layer, respectively, each form for instance a portion of a unique (continuous) fabric part. The same holds for a fastening flap formed as a fabric part.

Here, for creating at least on inflatable region (in the form of a gas cushion) of the airbag device, that extends as a head protection in front of a lateral window pane of a motor vehicle, not only two separate airbag layers are simply connected to each other along their outer boundary, but the two airbag layers moreover form components of a single airbag part, that is reverted along a folding line in a way, that the two airbag layers lie on top of each other for forming an inflatable region of the airbag device. With respect to the state of the airbag device in which the airbag device is built into a motor vehicle, one of the airbag layers then lies in front of a lateral vehicle body, particularly in front of a window pane and/or at least a pillar (A-, B-, C-, or D-pillar) provided at the lateral vehicle body, while the other opposing material layer faces the vehicle interior space and particularly the head of a vehicle occupant to be protected.

The layout (fabric layout), on which the respective airbag region is based, is here also denoted as butterfly-cut, wherein the two airbag layer form wings, which meet at the folding line, so to speak at the body of the butterfly, and are there integrally formed with each other.

With respect to the state of the airbag device in which the airbag device is built into a motor vehicle, the folding line (as an upper edge of the airbag device) thereby particularly extends along a lateral roof edge of a motor vehicle.

Particularly, in case an airbag device serving for head protection comprises a plurality of inflatable regions, that form a gas cushion in the inflated state, respectively, it is provided according to another aspect of the invention, which is in principle independent from the butterfly-design of the airbag parts forming the airbag regions, but can however also be realized together herewith, that the at least two inflatable regions are formed by separate inflatable elements, which are connected to each other for forming a unique airbag device in the form of a head protection device and which are in flow communication for instance, so that gas can flow from the one inflatable element into the other inflatable element.

Two separate inflatable elements are thereby understood as two inflatable elements of an airbag device, that can each be produced independently from one another, e.g. also in case of arbitrary spatial or temporal separation, to form an element that can be inflated with gas (airbag region) and which are combinable subsequently by connecting them by means of a suitable connection element to form an airbag device. I.e., the two inflatable elements are formed by two separate gas cushions, which are not integrally connected to each other, but are connected to each other by means of a further (separate) connection element.

According to this invention aspect, an airbag device can be assembled according to a construction kit principle or according to a modular design out of a plurality of single components, which in turn are each designed such, that they can be cut having a loss of material that is as low as possible, for instance by stamping them out of a fabric web.

As module parts that can be used for constructing an airbag device, in particular airbag layers for forming inflatable airbag regions, connection channels for connecting the airbag regions, fastening flaps for fastening the airbag device to a motor vehicle body and tension bands for definably tensioning the airbag device in the inflated state are provided. Furthermore, modular components can be provided for receiving and for holding a gas generator as well as gas conducting and flame protection elements.

Hereby, an airbag device can be combined out of a plurality of standardized components and thereby the respective combination can be varied in a way that a large design variety of airbag devices to be produced can be realized by means of a limited number of standardized components. Thus, in case of different variants of a vehicle type, like e.g. the notchback variant on the one hand and the hatchback variant on the other hand, always the same components for the airbag device serving for head protection can be used for the front part (as seen along the vehicle longitudinal axis), while the rear part is varied corresponding to the respective vehicle variant.

According to an embodiment of the invention, the individual inflatable elements that form the inflatable regions of the airbag device are connected to each other via separate connection channels, which are connected to the inflatable elements, respectively. According to another aspect of the invention, the inflatable elements are connected to each other via connection portions in a gas conducting manner, each of which protrude from the inflatable elements and are for instance integrally formed with the latter. An additional connection tube can be arranged in addition in or at a respective connection region, formed as a connection channel or formed by connection portions, in order to provide for a flow connection between inflatable regions of the airbag device.

Thereby, the components provided for forming the inflatable elements and the connection regions, fastening flaps and, as the case may be, tension bands etc. can be held in readiness, respectively, in a plurality of different sizes and geometries, from which the suitable ones are then selected for a certain requirement profile or a certain motor vehicle type, respectively.

Furthermore, on the one hand said components can be held in readiness in a folded state, and, as the case may be, surrounded by a receptacle or protection covering, or, on the other hand, a complete head protection device is combined at first out of the components held in readiness, before the latter is folded and stored in a receptacle (covering).

The individual inflatable elements of the airbag device (e.g. formed by separate inflatable elements) serving as a head protection device extend—with respect to a state in which the airbag device is built into a motor vehicle—in the vertical direction so far, that they assure an effective head protection for a vehicle occupant, for instance substantially along the whole vertical extension of a lateral window pane. In contrast thereto, the connection channels or connection portions via which neighboring inflatable regions of the airbag device are connected to each other can comprise a significantly lower extension along the vertical vehicle axis, particularly in case they run along a region of the body of the motor vehicle, at which the impact of the head or upper part of the body of a vehicle occupant is not expected. Hereby, the cost of materials can be further reduced.

For connecting the individual components of the airbag device, different joining methods come into consideration, besides sewing fabric parts, particularly also the gluing as well as form-fitting connecting single components by sticking them together, wherein in addition also a (form-fit) connection to regions of the vehicle structure can be established. Furthermore, clamps or bandages or other connection means can be used for joining the individual components of the airbag device.

The fastening flaps provided for fastening the airbag device to a vehicle structure are advantageously fixed as separate components to the inflatable regions and/or connection portions or channels, namely e.g. via seams. Fixation takes place such that the fastening flaps can be reverted about the connection seams and therefore protrude with a fastening portion from the airbag device in the desired manner (and protrude beyond the latter) and can then be fastened with their fastening portion protruding from the airbag device to the vehicle structure, e.g. via a fastening opening.

Thereby, the connection lines (particularly seams) can run essentially parallel to an edge of a component of the airbag device, in whose region the respective fastening flap is arranged, or aslant and therewith inclined with respect to said edge; or they can comprise a curved run. Curved connection lines or seams, in particularly designed as arcuate tucks, allow for a flexible angle adjustment of the fastening flaps depending on how the fastening portion is reverted with respect to the respective tuck. This in turn can depend on the (temporally changing) force ratios at a respective fastening flap, particularly in the way, that the latter optimally aligns under the currently acting forces, respectively, and an optimal force transmission is assured.

In each of the afore-mentioned cases it can be provided that a respective fastening flap comprises more than two layers, each of which are fixed to a material layer of an inflatable region of a connection channel or portion of the airbag device. By using more than two layers of the fastening flap, additional security can be achieved by means of redundancy concerning the fixation of the airbag device via the fastening flaps.

A gas generator serving for filling the inflatable regions of the airbag device can be arranged inside or outside the airbag device, wherein in the latter case the gas generator would have to be brought in a flow communication with the airbag device via a gas carrying connection conduit. Of course, also several gas generators can be provided in order to quickly inflate the airbag device.

In case of arranging at least one gas generator inside the airbag device, besides arranging a gas generator in an inflatable region, particularly also a (central) arrangement between two inflatable regions can be considered, for instance in a connection region via which neighboring inflatable regions stand in flow communication.

Then, an ignition cable associated to the gas generator can for instance be passed out of a respective connection region along the extension direction of the latter, wherein by means of an outer bandage a sealing is achieved.

As a further component of an airbag device, particularly in case of an arrangement of a gas generator between two (neighboring) inflatable elements, a (e.g. tubular and essentially dimensionally stable) covering surrounding the gas generator can serve as a gas flow distributor by means of which a gas flow leaving the gas generator is distributed such, that it is distributed over the inflatable regions of the airbag.

In case it seems appropriate to fill the individual inflatable regions of the airbag with different amounts of gas, the outlets through which gas flows out of the gas flow distributor into the airbag regions that are to be inflated, can be chosen such with respect to their exhaust area, that differently strong gas flows flow into the individual airbag regions. In order to protect airbag material in the surrounding of the gas generator against damage due to gases leaving the gas generator, a flame protection device can be provided, for instance in the form of a protection layer sleeve or in the form of a fabric hose having a heat-resistant material layer or coating which surrounds the gas generator.

FIG. 1 shows a construction kit of components that can be used for producing an airbag device in the form of a head protection device for a vehicle occupant.

Under i) material layers or material parts (airbag layers/airbag parts) of different size and geometry are thereby illustrated, which can serve for producing an inflatable region of the airbag device, which forms a gas cushion in the inflated state. The airbag layers can be fabric layers in particular. Due to the essentially rectangular layout of the airbag layers, the latter can be stamped out of a material web, like for instance a fabric roll, with minimal cutting scrap.

After ii) different further material or fabric layers are illustrated which can serve for forming connection channels via which neighboring inflatable regions of an airbag arrangement can be (flow-) connected.

Under iii) several tension bands are illustrated which can serve for tensioning the airbag device and which, for this, engage for instance with different elements of the airbag device and/or with a vehicle structure.

Figure portion iv) finally shows several fastening flaps which can be used for fastening an airbag device to a motor vehicle structure.

From the components in the form of material layers for inflatable airbag regions and for connection channels between inflatable airbag regions as well as in the form of tension bands and fastening flaps depicted in FIG. 1, those are selected for producing a certain airbag device who fulfill the requirements for a certain airbag device—for instance depending on the vehicle type in which the airbag device shall be employed.

FIG. 2 shows an airbag device in the form of a head protection device which is combined out of components of the kind shown in FIG. 1, wherein said components are connected to each other, for instance by means of sewing and/or by sticking them together, in order to form a uniform airbag device.

According to FIG. 2 the resulting airbag device comprises two inflatable regions 1a, 1b, which—related to the state in which the airbag device is built into a motor vehicle—are spaced apart along the longitudinal vehicle axis x and stand in flow communication with each other via a connection channel 2. The inflatable regions 1a, 1b as well as the connection channel 2 of the airbag device are thereby formed by material layers or material parts of the kind shown in FIG. 1 under i) and ii).

Further, fastening flaps 4 protrude from the inflatable regions 1a, 1b of the airbag device as well as from their connection channel 2, which are separate elements with respect to the inflatable regions 1a, 1b and the connection channel 2, which can be fixed in a suitable manner—as will be described in more detail below—to said components 1a, 1b, 2 of the airbag device. Finally, several tension bands 3 are provided, one of which serves for connecting the two inflatable regions 1a, 1b of the airbag device and two further of which are provided for connecting each of the inflatable regions 1a, 1b of the airbag device to a vehicle structure, in order to be able to tension the airbag device in the inflated state with respect to the vehicle structure and to hereby achieve optimal conditions for intercepting a vehicle occupant in case of a crash.

The airbag device shown in FIG. 2 is formed out of a construction kit of pre-assembled components, which are on the one hand material layers or material parts (airbag layers/fabric parts) for forming inflatable regions 1a, 1b as well as connection channels 2 of the airbag device. Furthermore, as components separate thereof, the fastening flaps 4 and the tension bands 3 are constituent parts of the construction kit serving for producing the airbag device shown in FIG. 2.

By means of FIG. 2 it becomes further clear that the two inflatable regions 1a, 1b of the airbag device extend along the vertical vehicle axis z over a larger extension than the connection channel 2 lying in between said two inflatable regions 1a, 1b. Hereby, the two inflatable regions 1a, 1b of the airbag device each form a large-area gas cushion for protecting a vehicle occupant in case of a crash, by means of which particularly at least a lateral window pane of a motor vehicle can be covered to a large extent. The connection channel 2 comprises in contrast thereto a significantly smaller extension along the vertical vehicle axis z. Connection channels 2 are therefore—related to a state of the airbag device in which the latter is built into a motor vehicle—advantageously positioned at locations, at which an impact of a vehicle occupant is not to be expected.

Besides, parts of the lateral structure of a motor vehicle are indicated in FIG. 2, namely two lateral window panes Fa, Fb as well as an A-, B- and C-pillar, by means of dashed lines, which are (partly) covered by the airbag device. Thereby, the inflatable regions 1a, 1b of the airbag device cover those parts of the lateral body structure, i.e. of the window pane Fa, Fb as well as the A-, B- and C-pillar, with which the head of a vehicle occupant can collide in case of a crash.

Precisely, the two inflatable regions 1a, 1b of the airbag device formed as, with respect to each other, separate, inflatable elements, each consist according to FIG. 2 out of two material or fabric layers of the kind shown in FIG. 1 under i), which are for instance connected to each other (e.g. by means of seams) in the way, that they each define an inflatable region of the airbag device that can be filled with gas, wherein one of the material layers faces the lateral vehicle structure, i.e. the window panes Fa, Fb as well as the structure forming pillars A, B, C, and the other opposing material layer faces the vehicle interior space, i.e. particularly a vehicle occupant that is to be protected.

As an alternative, the two material or fabric layers that each form an inflatable region, can also be constituent parts of an integral material layout or material part, as will be described in more detail below.

FIG. 3 shows an arrangement according to FIG. 2 in a more detailed illustration. Here, seams N can be recognized at the inflatable elements forming the airbag regions 1a, 1b as well as at the connection channel 2, a tension band 3 and at the fastening flaps 4, that serve for fastening the individual components 1a, 1b, 2, 3, 4 of the airbag device to each other.

Thereby, the seams N at the inflatable regions 1a, 1b as well as at the connection channel 2, also serve for connecting material or fabric layers to each other, out of which the respective inflatable region 1a, 1b or the connection channel 2 consists. Typically, these are two fabric layers, one of which—related to a state of the airbag device in which the latter is built into a motor vehicle—faces the lateral body structure of a motor vehicle, i.e. particularly a window pane and/or one of the structure forming pillars, and the other one of which faces the vehicle interior space and therewith in particular the head of a vehicle occupant that is to be protected.

Furthermore, tucks A are recognizable in FIG. 3, along which the two material or fabric layers which form the inflatable regions 1a, 1b of the airbag device, are connected to each other, in order to form constrictions. Hereby, the respective inflatable region 1a, 1b is structured such in the inflated state that an optimal protection of a vehicle occupant is assured.

Furthermore, according to FIG. 3 an additional (third, non-inflatable) region 1c (in the form of a sail) is provided, which is formed out of triangle-shaped material or fabric layouts and is therefore particularly suited for covering a triangle window of a motor vehicle.

Furthermore, an additional non-inflatable region 1d in the form of a further sail is shown in FIG. 3 which can be optionally arranged below the connection channel 2, so as to connect one of the inflatable regions 1a, 1b of the airbag device to the vehicle structure thereabouts. Hereby, rearing up of the associated boundary portion of the corresponding inflatable region 1a, 1b upon inflation can be avoided, by means of which a wall portion of said inflatable region 1a, 1b could get into the gas jet of a gas generator used for inflation. Hereby, a damage of otherwise endangered wall portions of the inflatable region 1a, 1b can be avoided in case of using hot gases for inflating the airbag device, particularly by means of a pyrotechnical gas generator.

Figure 4A:
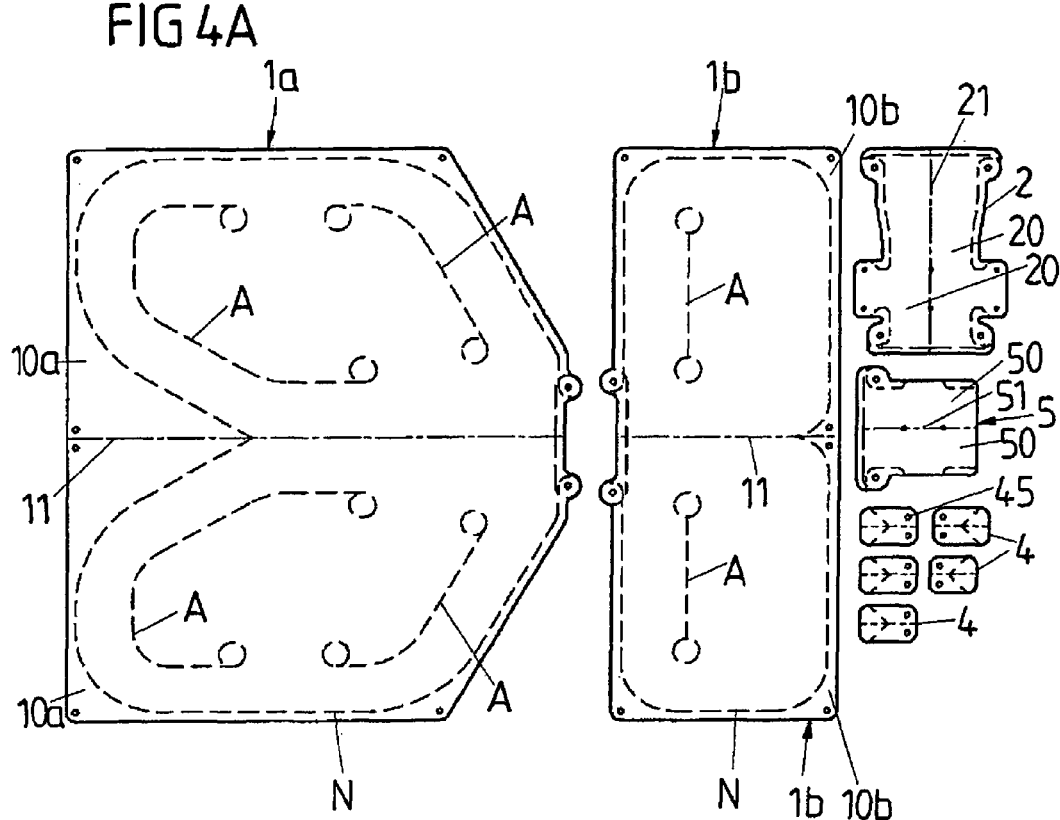
FIG. 4a shows a third embodiment of components of an airbag device, which can be combined to form a head protection device.
Figure 5A:
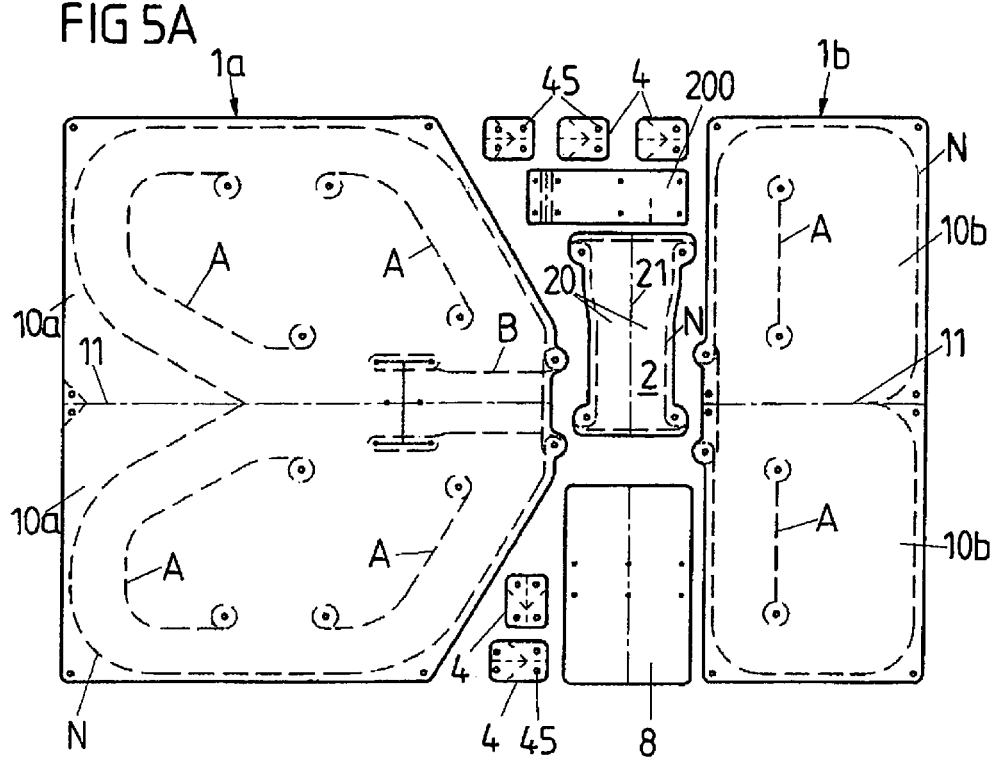
FIG. 5a shows a fourth embodiment of components of an airbag device, which can be combined to form a head protection device.

In such Figures, in which the components of the airbag device are shown at least partly in a non-joined state, like for instance in the afore-described FIG. 3, the FIG. 4a and the FIG. 5a, tucks A and seams N shown there respectively point to those locations at which after joining the individual components of the airbag device the corresponding tucks A and seams N will reside. The latter are not yet present at the individual components of the airbag device in the state shown in the FIGS. 3, 4a and 5a.

Figure 4B:
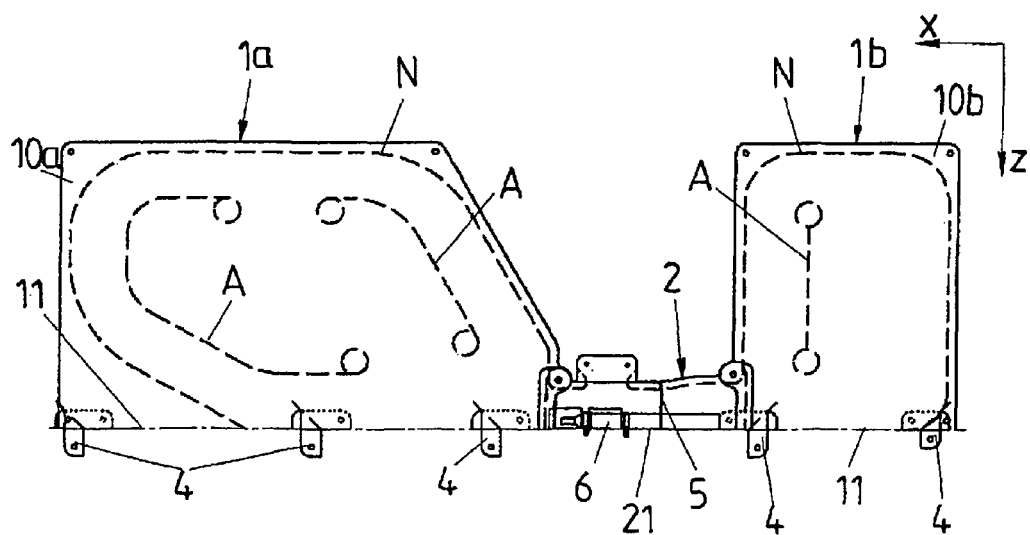

In the FIGS. 4a and 4b a further embodiment of an airbag device serving as a head protection is shown, wherein in FIG. 4a the constituent parts of said airbag device are individually shown and FIG. 4b shows the airbag device in the assembled state.

A particularity of the arrangement shown in the FIGS. 4a and 4b is that one-piece material layouts or material parts (particularly one-piece fabric layouts (fabric parts), which form inflatable airbag regions 1a, 1b, a connection channel 2 between said airbag regions 1a, 1b as well as a receptacle 5 for a gas generator 6, are respectively accomplished to form a butterfly-design. This means, that the individual layouts/material parts respectively comprise two material layers or, more precisely, fabric layers 10a, 10b, 20 or 50, which are essentially identically designed, namely mirror-symmetrically with respect to a symmetry axis 11, 21 or 51, along which the two layers 10a, 10b, 20, 50 are connected to each other. The two material layers thus quasi form the wings of a butterfly in the respective material layout, which are integrally formed with each other along the respective symmetry axis 11, 21, 51.

Also fastening flaps 4 that are provided for fastening the airbag device to a vehicle structure, particularly in the roof edge region, are formed mirror-symmetrically here. Further details of said fastening flaps 4 respectively comprising at least one fastening opening 45 will be described by means of the FIGS. 10a to 15b below.

As becomes clear by means of FIG. 4b, a gas generator 6, which serves for inflating the two inflatable regions 1a, 1b spaced apart along the longitudinal vehicle axis x, is arranged here in the connection channel 2 using a flexible receptacle 5, which connects the two inflatable regions 1a, 1b in a gas conducting manner. Details for arranging a gas generator 6 in the airbag device, particularly in the connection channel 2 of the airbag device, are shown in the FIGS. 16 to 22 and will be explained below by means of the latter.

As can be seen by means of a synopsis of FIGS. 4a and 4b, the material or fabric layouts forming the inflatable regions 1a, 1b as well as the connection channel 2 are reverted once about their respective symmetry axis as folding line 11 or 21, respectively, and are afterwards sewn to each other along their outer boundary forming seams N, so that two inflatable regions 1a, 1b as well as connection channel 2 (flow-) connecting said inflatable regions result.

The symmetry axes or folding lines 11, 21 thereby extend along the lateral roof edge DK, compare FIG. 2, of a motor vehicle, in case the airbag device shown in the FIGS. 4a and 4b is built into such a motor vehicle. Correspondingly, the fastening flaps 4 are fixed (in a manner described in more detail by means of the FIGS. 10a to 15b below) in the region of said symmetry axes or fold lines 11, 21 to the inflatable regions 1a, 1b as well as, as the case may be, to the connection channel 2, via which fastening flaps 4 a fastening of the airbag device to the motor vehicle, particularly to a lateral roof edge region of a motor vehicle, takes place.

Figure 5B:
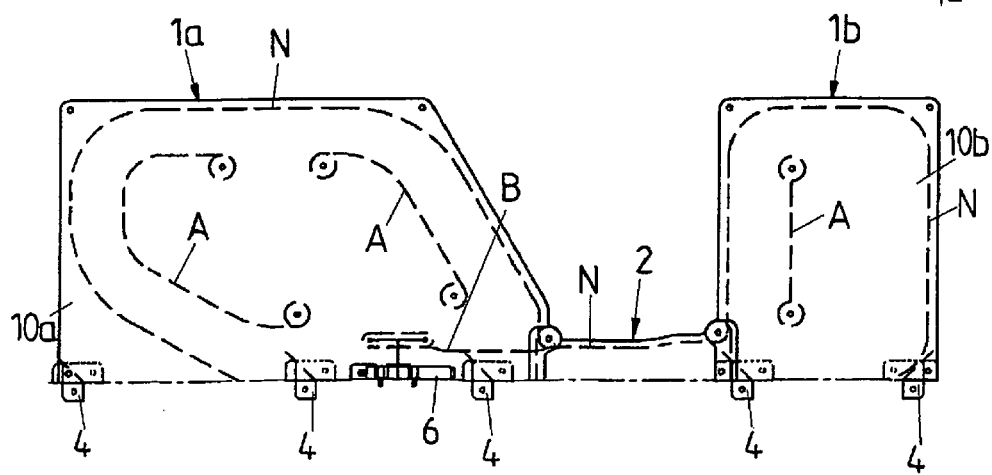

In the FIGS. 5a and 5b a modification of the embodiment of the FIGS. 4a and 4b is shown, wherein the essential difference lies in the fact, that a gas generator 6 serving for inflating the two inflatable regions 1a, 1b spaced apart with respect to each other is not arranged in the connection channel 2, but is arranged in one of the two inflatable regions 1a, 1b. For this, a room for receiving the gas generator 6 is formed in said inflatable region 1a by means of a delimiting seam B.

Furthermore, a protection layer sleeve 8 for the gas generator 6 and a bandage 200, each in an evenly outspread state, can be seen in FIG. 5a, whose function is explained in more detail by means of the FIG. 18a to 20b or 16, respectively, below.

In case of the airbag device shown in the FIGS. 4a and 4b as well as in case of the one shown in FIGS. 5a and 5b, the two inflatable regions 1a, 1b of the airbag device as well as the connection channel 2 can each be produced separately out of a respective material or fabric layout by folding the latter about the axis or folding line provided for this purpose and by subsequently sewing the two resulting opposing material layers 10a, 10b or 20 with each other or connecting them to each other in any other way, so as to create an inflatable airbag region or connection channel, respectively. Thereby, using seams that are as straight as possible is advantageous with respect to production aspects. Afterwards the pre-assembled components of the airbag device are connected to each other, for instance by sewing or in any other manner to be described in the following.

So, FIG. 6a shows an arrangement, in case of which on the one hand a front inflatable region 1a of the airbag device as well as on the other hand a rear inflatable region 1b of the airbag device form a module together with an associated connection channel 2, respectively, which is completely pre-assembled including fastening flaps 4 fixed thereto as well as tucks A for creating constrictions. These two modules are subsequently connected to each other in a form-fit manner in that the connection channel 2 is passed through a loop 13 and a recess 13a of the first inflatable region 1a lying behind and engages with a broadening 23 at its front end with a (ring-shaped closed) tuck 13b of the first inflatable region 1a provided for this purpose, compare FIG. 6b. The loop 13 at the first inflatable region 1a of the airbag device thereby serves in the completed state for the defined positioning of the connection channel 2 as well as the first inflatable region 1a with respect to each other. Additionally, the first inflatable region 1 and the connection channel 2 can be connected to each other via seams or any other connection means.

In the FIGS. 7a and 7b a modification of the arrangement of the FIGS. 6a and 6b is shown, wherein the essential difference lies in the fact, that the inflatable regions 1a, 1b of the two modules are each already folded to a (longitudinally) airbag package and are arranged as a folded airbag package in a (hose-like) protection covering H before a connection of the two modules via the connection channel 2 integrated into the second module takes place, compare the transition from FIG. 7a to FIG. 7b.

Figure 8:
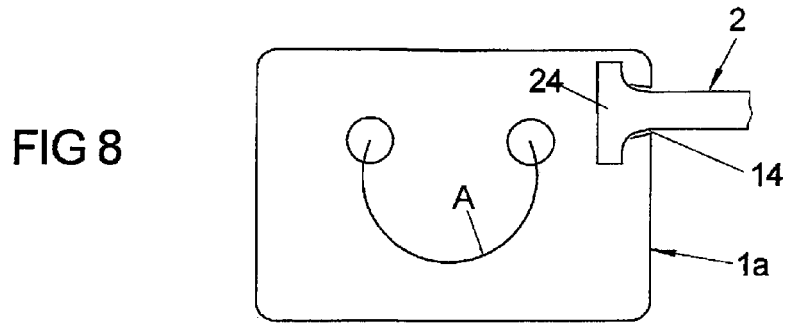
FIG. 8 shows a further example for sticking together two components of an airbag device that can be combined according to a construction kit principle.

Finally, FIG. 8 shows a further possibility for form-fittedly arranging a connection channel 2 at an inflatable region 1a of an airbag device, wherein here the connection channel 2 engages with a broadened end portion 24 with the boundary of a through-opening 14 of the inflatable region 1a, trough which said connection channel 2 reaches.

Figure 9A:
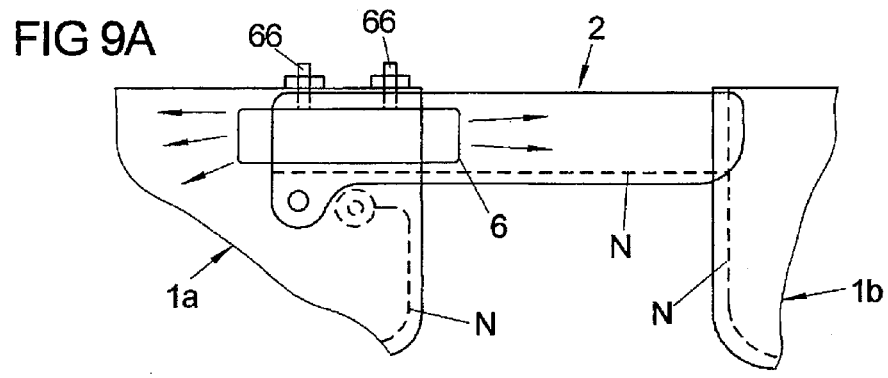
FIG. 9a-9c show three embodiments regarding the use of connections means for assembling components of an airbag device that can be combined according to a construction kit principle.
Figure 9B:
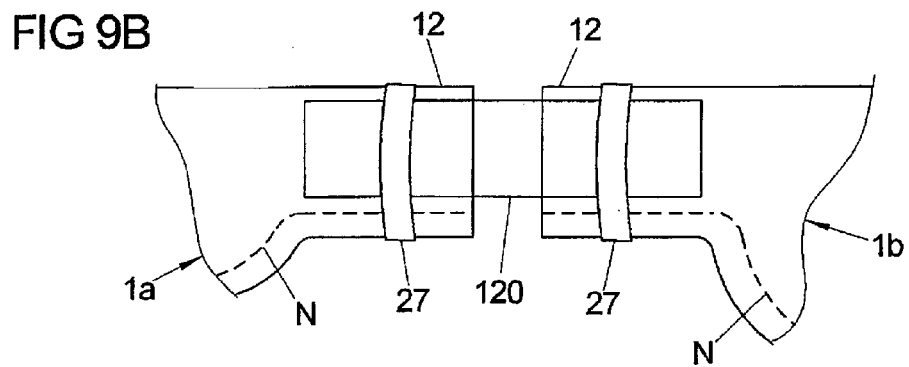
Figure 9C:
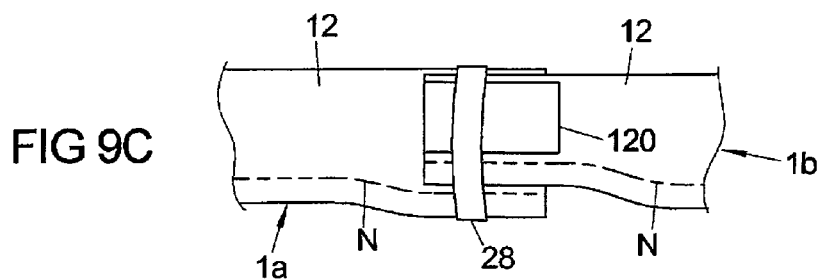

In the FIGS. 9a to 9c further variants for connecting components of an airbag device are shown.

According to FIG. 9a fastening bolts 66 protrude from a gas generator 6, which respectively reach through a fastening opening in a first inflatable region 1a of the airbag device as well as in a connection channel 2 of the airbag device, which is combined with a second inflatable region 1b to form a module. Using nuts screwed on the fastening bolts, a connection is established between the first inflatable region 1a and the connection channel 2 and therefore the whole module comprising the connection channel 2 in the region of the gas generator 6.

According to FIGS. 9b and 9c two inflatable regions 1a, 1b of an airbag device being spaced apart with respect to each other each comprise a connection portion 12 that is respectively directed towards the other one of the two inflatable regions 1a, 1b. These two connection portions 12 form a connection region together, via which the two inflatable regions 1a, 1b, under additional use of a connection tube 120, stand in communication, to be more precisely, in flow communication. The connection tube 120 is thereby arranged in said connection region.

Both connection portions 12 are connected to the connection tube 120 by means of a ring-shaped fastening element 27 or 28, which encompasses the connection tube 120 under interposition of at least one of the connection portions 12 in a ring-shaped manner and hereby fastens the respective connection portion 12 to the connection tube 120.

In case of the embodiment shown in FIG. 9b an own fastening ring 27 is thereby associated to each of the connection regions 12, whereas in case of the embodiment shown in FIG. 9c a single fastening ring 28 fastens both connection portions 12 to the connection tube 120.

Figure 10A:
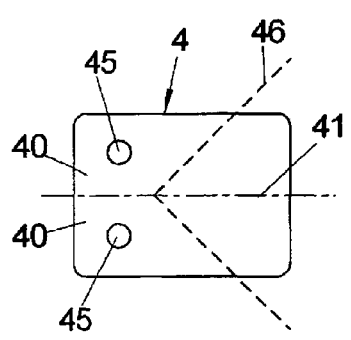
FIG. 10a-10c show an embodiment for arranging and fixing of fastening flaps on an airbag device.
Figure 10B:
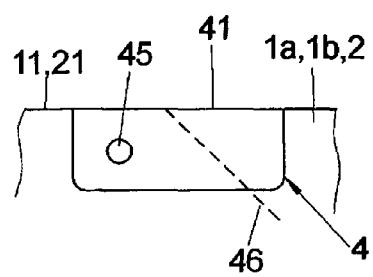
Figure 10C:
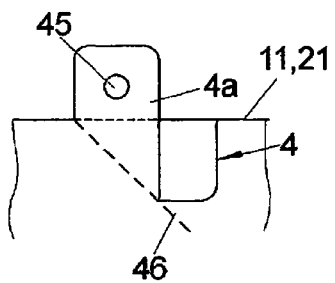

In the FIGS. 10a to 10c a first embodiment of fastening flaps 4 is shown, which can serve for fastening an airbag device of the kind shown by means of FIGS. 1 to 7b to the structure of a motor vehicle or to associated connection points of the structure.

According to the FIGS. 10a to 10c, the fastening flaps 4 are each designed two-layered, wherein the two material layers 40 (being designed mirror-symmetrically with respect to each other) of a respective fastening flap 4 (for instance in the form of fabric layers) are integrally connected to each other along a symmetry axis or folding line 41 according to the butterfly-principle, so that the two-layer fastening flaps 4 are each designed in one-piece.

A respective fastening flap 4 is fixed to an associated component of the airbag device, for instance to one of the inflatable regions 1a, 1b or to a connection channel 2 in a way, that each of the two layers 40 of a fastening flap 4 is respectively connected to a layer 10a, 10b or 20 of the corresponding component 1a, 1b, 2, compare FIGS. 4a and 5a.

The fixation of a respective layer 40 of the fastening flap 4 to a layer of the associated component 1a, 1b or 2 of the airbag device is thereby established via a seam 46 which in the embodiment of the FIGS. 10a to 10c runs inclined (for instance under an angle of) 45° with respect to the symmetry axis or folding line 11, 21 of the respectively associated component 1a, 1b, 2 of the airbag device. After producing said connection seam 46 for connecting a respective material layer 40 of the fastening flap 4 to an associated material layer 10a, 10b, 20 of a component 1a, 1b, 2 of the airbag device, each of the two material layers 40 of the fastening flap 4 is folded with a free end portion (fastening portion 4a) around said connection seam 46 running inclined, so that the layers 40 are respectively positioned with a free end above the symmetry axis or folding line 11, 21 of the associated component 1a, 1b or 2 of the airbag device.

The free end portions 4a of a fastening flap 4 serving as fastening portions are each provided with a fastening opening 45, wherein the fastening openings 45 of the two layers 40 cover each other or are aligned with each other in the folded around the seam 46 state, so that they form a continuous fastening opening for fastening to a motor vehicle structure, for instance by means of screws or rivets.

Figure 14:
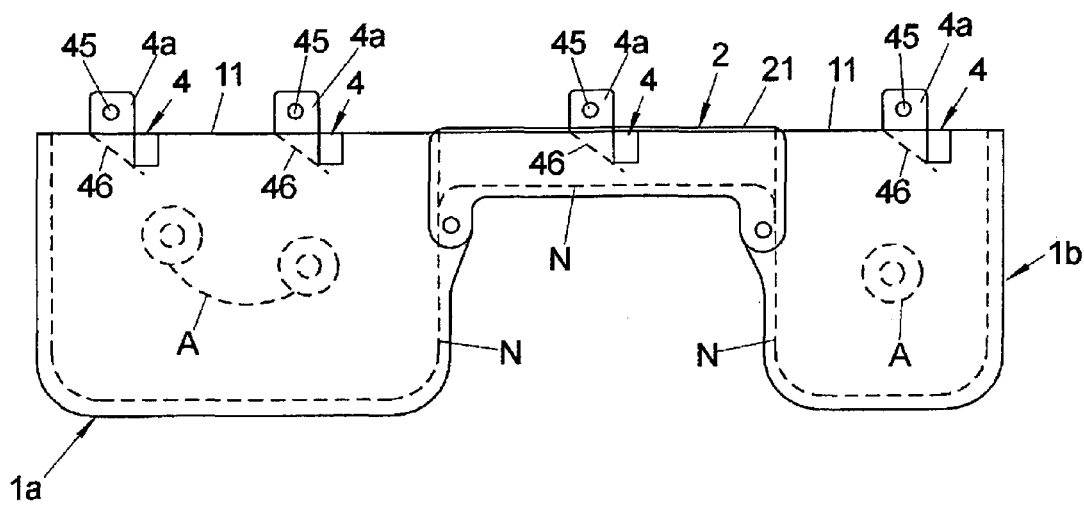
FIG. 14 shows an airbag device serving as a head protection device having fastening flaps of the kind shown in FIGS. 10a to 10c.

Thereby, the fastening flaps 4 respectively protrude with their fastening portions 4a in the form of free end portions serving for fastening beyond the outer boundary or the outer edge of the associated inflatable region of the airbag device (here formed by a folding line 11, 21), compare FIG. 10c as well as FIG. 14. The respective fastening location serving for fastening to a motor vehicle structure (fastening opening 45) at the fastening flap 4, which is provided at the folded fastening portion 4a, is correspondingly spaced apart from said lateral boundary in the form of a folding line 11, 21.

FIG. 14 shows the application of fastening flaps 4 of the kind shown in FIGS. 10a to 10c to an airbag device that comprises two inflatable regions 1a, 1b spaced apart with respect to each other and a connection channel 2 connecting the two inflatable regions 1a, 1b. Fastening flaps 4 of the afore-described kind are thereby provided at both of the inflatable regions 1a, 1b as well as at the connection channel 2, namely in the region of an upper edge, respectively, of the respective component 1a, 1b, 2, which in turn are here exemplary formed by a symmetry axis or folding line 11, 21.

Figure 10D:
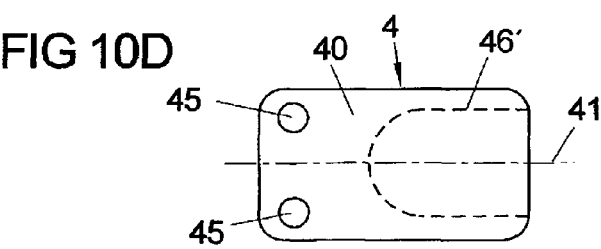
Figure 10E:
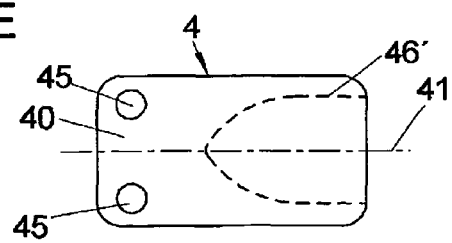
Figure 12A:
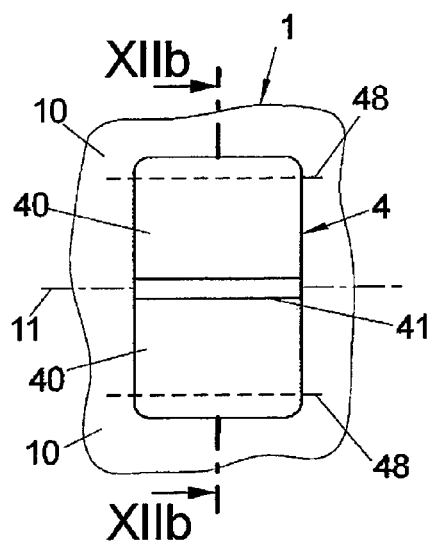
FIG. 12a-12d show a second modification of the embodiment according to FIGS. 10a to 10c.
Figure 12B:
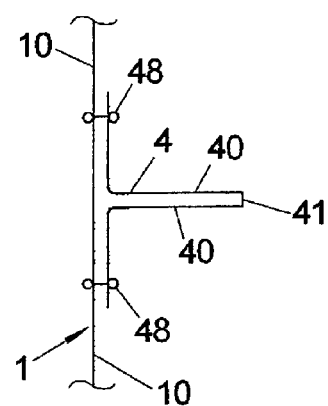
Figure 12C:
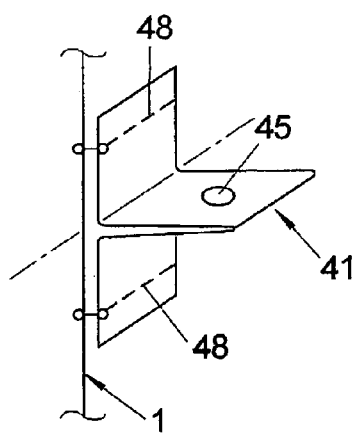
Figure 12D:
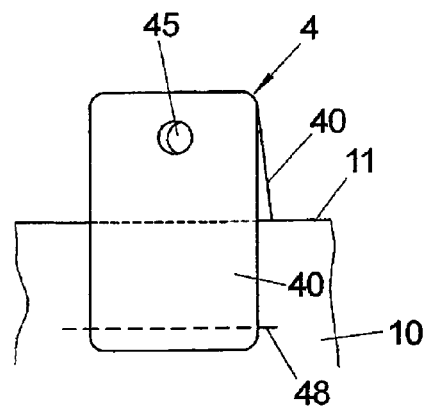
Figure 13A:
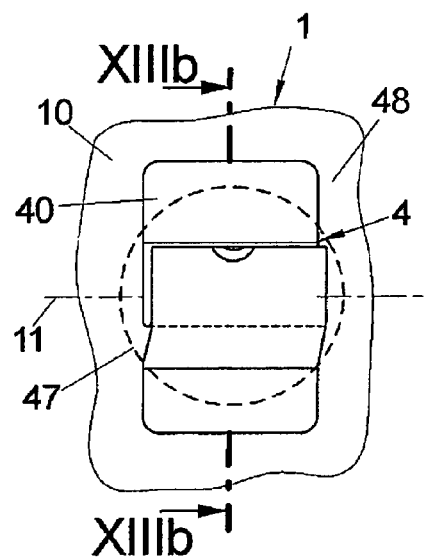
FIG. 13a-13d show a third modification of the embodiment according to FIGS. 10a to 10c.
Figure 13B:
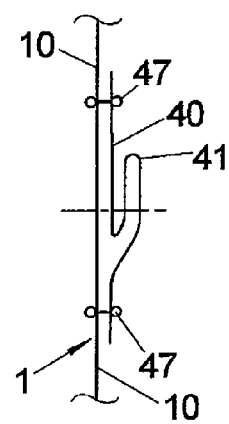
Figure 13C:
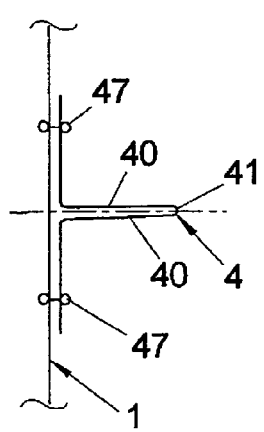
Figure 13D:
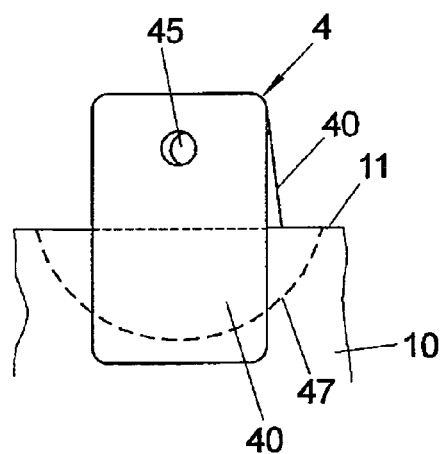

In each of the FIGS. 10d and 10e a modification of the fastening flap 4 shown in FIGS. 10a to 10c is shown, namely in each case in the (folded-open) state of the fastening flap underlying the FIG. 10a.

According to the FIGS. 10d and 10e the respective connection seam 46' that serves for connecting a respective material layer 40 of the fastening flap 4 to an associated material layer 10a, 10b, 20 of a component 1a, 1b, 2 of the airbag device, is formed as a curved seam, wherein the seam 46' in the case of FIG. 10d is essentially designed U-shaped and in case of the FIG. 10e is essentially designed V-shaped, and wherein in addition the respective seam 46' ends in a front face of the fastening flap 4 opposing the fastening openings 45.

In the FIGS. 11a to 11c a further modification of the arrangement of the FIGS. 10a to 10c is shown, wherein the difference lies in the fact, that according to the FIGS. 11a to 11c the seam 47, via which the fastening flap 4 is fastened to an associated component 1a, 1b or 2 of an airbag device, is formed as a curved seam, here concretely as a seam running in an arcuate manner along a circular path. Hereby, different folding angles of the free end portions of the two material layers 40 of the fastening flap 4 can be realized, depending on about which region of the fastening seam 47 the free end portions are folded.

As it has already become clear by means of the FIGS. 10a to 10e, a (ring-shaped) closed design of the respective connection seam 46 or 47 is not necessarily required, since the seams are in any case only loaded in certain partial regions in the loading case.

In the FIGS. 11d to 11g a modification of the fastening flap 4 of the FIGS. 11a to 11c is shown, wherein the essential difference lies in the fact, that the fastening flap 4 shown in the FIGS. 11d to 11g is designed all in all four-layered, wherein also in this case the fastening flap 4 is formed in one piece, the all in all four-layered fastening flap thus being formed by multiply (two times) folding a material layout in the form of an integral material part (fabric part).

Concretely, a—with respect to a first folding axis or folding line 41' symmetrically formed—material part is assumed, compare FIG. 11d, out of which by means of folding (reverting) about said symmetry axis or folding line 41' the material part formed in FIG. 11e being folded once and therefore being only two-layered is formed, which in the plan view corresponds to the one shown in FIG. 11a, but is however designed two-layered (and not single-layered) in contrast to the latter. Subsequently, the same folding processes are applied to the two-layer material part of FIG. 11e as described in beforehand by means of the FIGS. 11a to 11c for a single-layer base part, wherein the second symmetry or folding axis 41, about which according to FIG. 11e the next folding procedure proceeds, is oriented perpendicular to the first symmetry axis or folding line 41'.

The folding processes occurring one after another are indicated in the FIGS. 11d and 11e by means of an arrow P1 or P2, respectively.

In its readily folded state, in which it is additionally fastened via a fastening seam 47 to an associated component 1a, 1b, 2 of an airbag device, the fastening flap 4 is formed four-layered according to FIG. 11g, wherein a respective double layer 40 serves for connecting to a layer 10a, 10b, 20 of an associated component 1a, 1b or 2 of the airbag device, respectively.

By means of such a design of the fastening flaps 4 having more than two layers, the latter are additionally enforced, so as to be able to resist also increased loads. Particularly, the risk of combing out filaments at the boundaries of the fastening flap 4 is further reduced.

In case the component 1a, 1b, 2 of the airbag device, to which a respective fastening flap 4 is associated, is not a component designed according to the butterfly-principle having a symmetry axis or folding line, the respective folding flap 4 is advantageously attached generally in the region of the upper boundary/the upper edge of the corresponding component 1a, 1b, 2, which is associated to the roof edge of the motor vehicle; and the corresponding seams 46, 47 then run inclined or curved with respect to the upper edge of the respective component 1a, 1b, 2 (which in the embodiment at hand of FIGS. 10a to 10c or 11a to 11c is especially formed by a symmetry axis or folding line). In general it can also be an arbitrary upper edge of an airbag device serving as a head protection device that is associated to the roof edge region of a motor vehicle.

Of course, the fastening flaps 4 can also be provided at other regions of an airbag device, for instance at lateral edges or also at a lower edge that faces the vehicle floor and lies for instance in the built-in state of the airbag device in the region of the door rail of a motor vehicle door.

In the FIGS. 11c(1) to 11c(5), the fastening flap 4 of FIG. 11c is shown in different load situations that lead to a relative displacement of the fastening portion 4a and therewith of the fastening opening 45, via which the fastening flap 4 is to be fastened to a supporting motor vehicle part, with respect to the connection locations, e.g. a seam 47, via which the flap 4 is to be fastened to an associated component of an airbag device.

The FIG. 11c(3) thereby shows the normal position of the fastening flap 4 without an impact of significant external forces e.g. due to a crash and an inflation of the inflatable regions of the airbag device associated herewith. This corresponds to FIG. 11c, wherein here T denotes the section of the connection seam 47 that is (potentially) especially loaded in this position, since a force introduction between a fastening flap 4 and an associated component of the airbag device can take place via said section.

By means of FIGS. 11c (1) and 11c (2) it becomes clear, that upon a load that has the tendency to move the fastening opening 45 away from the connection seam 47 and to thereby tilt the fastening portion 4a, the loaded section T of the connection seam 47 increases by trend in its extension along the connection locations or seam 47 and therefore the introduced force is distributed over a larger region (since the loaded seam portion of the connection seam 47 moves away from the symmetry axis or folding line 41 of the fastening flap 4 and at the same time the decline of the loaded seam portion T with respect to said folding line 41 decreases).

Upon a load in the opposite direction, as shown by means of FIGS. 11c (4) and 11c (5), in case of which the fastening opening 45 of the fastening flap 4 approaches by trend the connection seam 47 due to a corresponding inclination of the fastening portion, the loaded section T of the fastening seam 47 moves in contrast thereto towards the symmetry axis or folding line 41 and is inclined stronger with respect to the latter. In this case the introduced force concentrates at the connection seam 47 between the fastening flap 4 and an associated component of the airbag device on a relatively small region; thus, a stronger force concentration occurs.

Insofar, an arrangement of the fastening flaps 4 at an airbag device on the one hand and at the motor vehicle on the other hand is advantageous, which in case of typical (frequent) crash situations leads to a force introduction according to FIGS. 11c(1) and 11c(2).

The movement of the fastening portion 4a at the fastening flap 4 described by means of FIGS. 11c(1) to 11c(5) occurs essentially in a plane that corresponds to the main expansion plane of the respectively associated inflatable region 1a, 1b of an airbag device as shown in FIG. 14.

In the following, variants of fastening flaps for fixing the airbag device or an inflatable region to the motor vehicle structure are shown by means of FIGS. 12a to 12d and 13a to 13d, which in contrast to the embodiments of FIGS. 10a to 10e and 11a to 11g do not comprise a turned-down fastening portion 4a in the form of a free end portion of the respective fastening flap. Fastening flaps of the kind shown in FIGS. 12a to 13d however, may eventually be employed in combination with the afore-described fastening flaps; for instance in the way, that for fastening an airbag device to a motor vehicle structure fastening flaps having a turned-down fastening portion 4a of the kind shown in FIGS. 10a to 10e as well as 11a to 11g on the one hand and additionally also fastening flaps of the kind that is to be described subsequently by means of FIGS. 12a to 13d are used.

In the FIGS. 12a to 12d a variant of a fastening flap 4 is shown which is fixed by means of seams 48 running parallel to the upper edge 11 (for instance in the form of a symmetry axis or a folding line) of an inflatable region 1 or to any other component of an airbag device to said airbag device, namely in the way, that every layer 40 of the integral, two-layer fastening flap 4 is fixed to a respective material layer of the associated component 1 of the airbag device. Thereby, the fastening flap 4 forms a loop in the fixed state having a fastening opening 45 via which a fastening to a vehicle structure can take place, for instance by means of fastening bolts, screws or rivets.

In contrast to the fastening flaps shown by means of FIGS. 10a to 10c as well as 11a to 11c, no turning down of free end portions takes place here in order to bring them into their functioning positions; but rather the fastening flap 4 of the FIGS. 12a to 12d comprises directly after its fixation to an associated component 1 of an airbag device in each of its two layers 40 a fastening portion having a fastening opening 45 and protruding beyond the upper edge 11 of said component 1, respectively, which fastening portion is delimited amongst other things by the folding line 41 of the fastening flap 4.

In the FIGS. 13a to 13d a modification of the arrangement of FIGS. 12a to 12d is shown, wherein the essential difference lies in the fact that for fastening the fastening flap 4 in the form of a fastening loop, curved seams, here in the form of arcuate seams running along a circular path, are used.

Figure 15A:
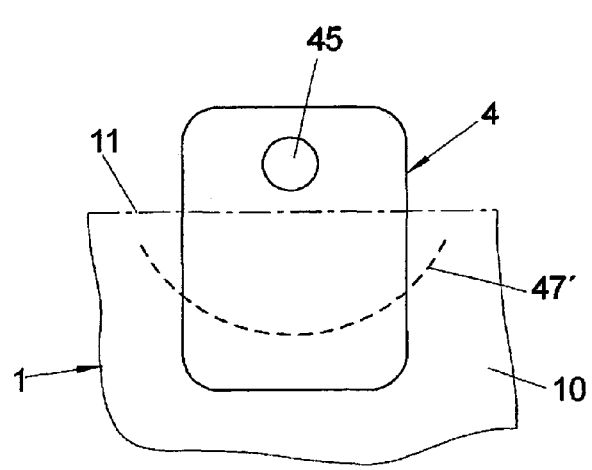
FIG. 15a-15b show a further embodiment for arranging and fixing of fastening flaps on an airbag device.
Figure 15B:
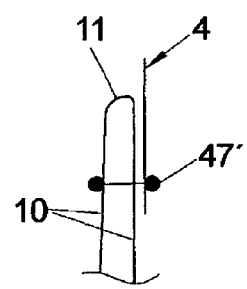

Finally, in the FIGS. 15a and 15b a one-sidedly fixed, particularly sewn-on, fastening flap 4 is shown, which is fastened in the region of the upper edge 11 of a (two-layer) component 1 of an airbag device to said component 1, namely using a seam 47' which at the same time connects two layers 10 of said component 1 of the airbag device to each other and hereby defines a constriction in said component 1. Here, the fastening flap 4 can be joined after reverting and, as the case may be, folding of the component 1 forming an inflatable airbag region.

Figure 16:
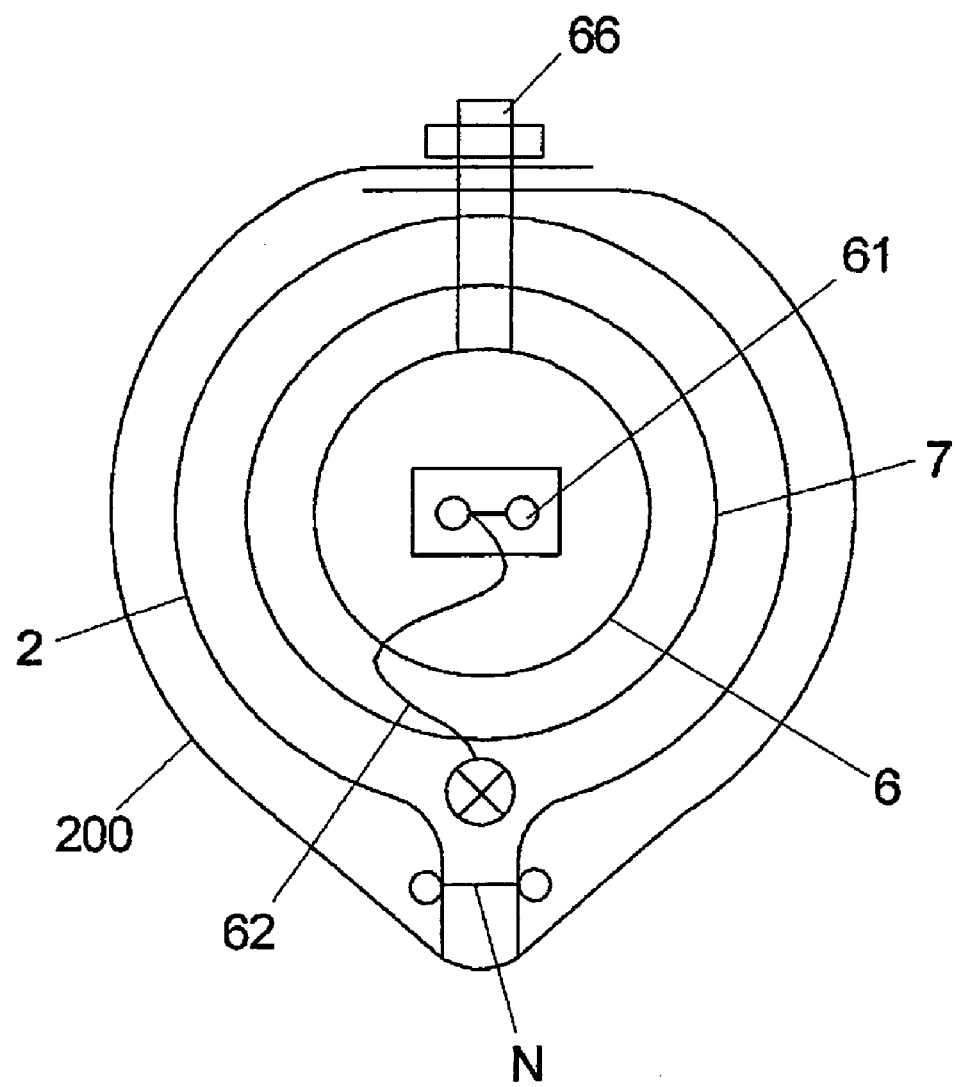
FIG. 16 shows an example for the arrangement of a gas generator in a connection channel that connects two inflatable regions of an airbag device serving as a head protection device.

FIG. 16 shows a cross section through a connection region 2, e.g. in the form of a connection channel) of an airbag device of the afore-described kind, in which a gas generator 6 is arranged. The gas generator 6 is arranged in a (here dimensionally stable but also flexibly designable) tubular receptacle 7 consisting e.g. out of metal, as it is shown also in FIGS. 21a to 21c. The tubular receptacle 7 surrounds the gas generator 6 that is designed here as a tubular gas generator, so that gas leaving the gas generator 6 firstly gets to the interior of the tubular receptacle 7 and afterwards escapes in the axial direction through frontal outlets of the tubular receptacle, wherein for instance each of the two frontal outlets 71, 72, as shown in FIG. 21c, can be associated to an inflatable region of the airbag device.

The gas generator 6 comprises an electrical connection 61 for an ignition cable 62 via which the gas generator 6 can be ignited in case of a crash in a sensor-controlled manner. The ignition cable 62 extends in the radial direction starting from an electrical connection 61 at an axial end of the gas generator 6 over the gas generator 6 and the tubular receptacle 7 into a region of the space enclosed by the connection region 2 outside the tubular receptacle 7 and is there further passed in the axial region. By means of a bandage 200 surrounding the connection channel 2, the ignition cable 62 can then be sealingly passed out of the space enclosed by the connection region 2, in order to establish an electrical connection to a control electronics for controlling the gas generator 6.

The tubular receptacle 7 arranged between the connection region 2 and the gas generator 6, the connection region 2 itself as well as the bandage 200 surrounding the connection region 2 are thereby connected to the gas generator 6 via fastening bolts 66 protruding from the gas generator 6 and associated nuts, so that said components 6, 7, 2, 200 form a constructional unit.

Figure 21A:
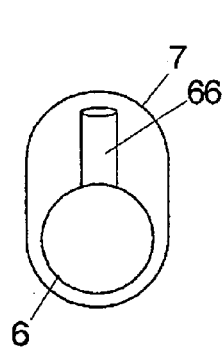
FIG. 21a-21c show a receptacle for the gas generator being oval in cross section and serving as a gas stream distributor at the same time.
Figure 21B:
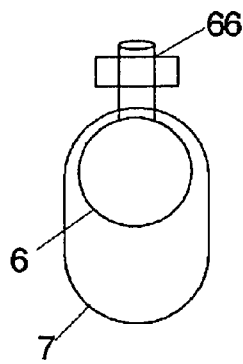
Figure 21C:
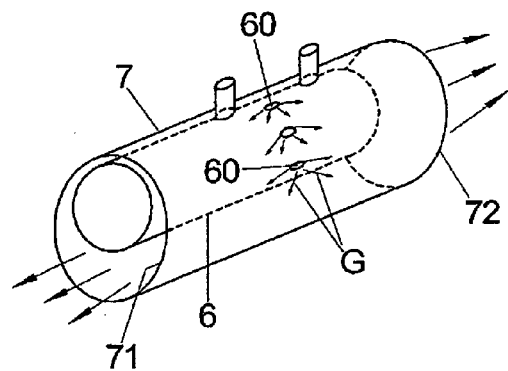

In the FIGS. 21a to 21 an assembly formed out of a gas generator 6 and a dimensionally stable, tubular or barrel-shaped receptacle 7 is shown once more in greater detail, namely in FIG. 21a in the form of two single parts and in the FIGS. 21b and 21c in the assembled state, in which the tubular receptacle 7, which is formed oval in cross section here, is attached to the gas generator 6 by means of fastening bolts 66 protruding from the gas generator 6 and associated nuts.

As becomes clear particularly by means of FIG. 21c, the tubular receptacle 7 extends in the axial direction of the gas generator 6 for example over the same length like the gas generator 6 itself; and it serves for forwarding gases G that during operation of the gas generator 6 escape through outlet openings 60 in the gas generator's lateral area and are then deflected in the axial direction by means of the tubular receptacle 7 and are thereby divided into two partial gas flows. The two partial gas flows then exit opposite with respect to each other in the axial direction out of two opposing frontal outlets 71, 72 of the barrel-shaped receptacle 7, from where they can get into a respective region of an airbag device that is to be inflated.

In the FIGS. 17a and 17b two further embodiments of tubular or barrel-shaped gas flow distributors 7 are shown, which are each attached by means of at least one fastening bolt 66 to the gas generator 6 and which divide a gas flow G leaving the gas generator 6 into two partial gas flows G1, G2 which each leave the gas generator 6 through a respective outlet 71, 71' or 72. In the cases of FIGS. 17*a* and 17*b*, the respective gas flow distributor 7 does thereby not extend over the whole length of the gas generator 6 in the axial direction.

The embodiments of the FIGS. 17*a* and 17*b* differ with respect to each other on the one hand in that in the case of FIG. 17*a* the outlet openings 60 of the gas generator 6 are provided in the lateral area of the latter, while in the case of FIG. 17*b* they are arranged frontally at the gas generator. A further difference consists in the fact that in the case of FIG. 17*b* the two frontal gas outlets 71', 72 of the gas flow distributor 7 comprise a different exhaust area, so that here two inflatable regions of an airbag device can be filled with a different amount of gas.

Further details of such gas flow distributors are described for instance in WO 2007/062847 A1.

In the FIGS. 18*a* and 18*b* an arrangement is shown according to which a gas generator 6 arranged in a connection channel 2 of an airbag device is surrounded by a protection layer sleeve 8 as a flame protection or protection against high pressures, which is spirally wound around the gas generator 6 in cross section. The protection layer sleeve 8 is attached together with the connection channel 2 to the gas generator 6 by means of fastening bolts 66.

The FIGS. 19*a* and 19*b* show the arrangement of FIGS. 18*a* and 18*b* in a state, in which a gas flow G leaves the gas generator 6 for inflating the airbag device, wherein the protection layer sleeve 8 is unwound and pressed outwardly against the inner surface of the connection channel 2.

In this respect it is to be noted that in the FIGS. 18*a* and 19*a* the protection layer sleeve 8 is shown together with the gas generator 6 and the connection channel 2, respectively, while in the perspective illustrations of FIGS. 18*b* and 19*b* the protection layer sleeve 8 is shown alone or together with a fastening bolt 66 for the sake of clarity, respectively.

Figure 20A:
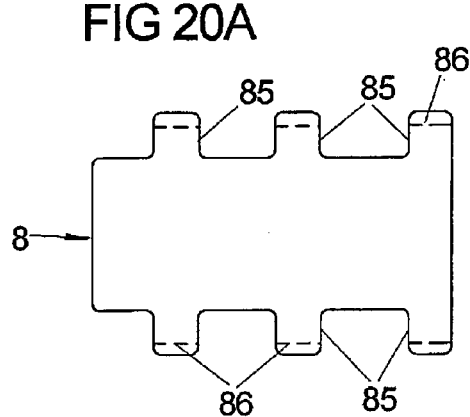
FIG. 20a-20b show a second embodiment of a wound protection layer for protecting the fabric of a connection channel of the airbag device against hot gases streaming out of a gas generator.
Figure 20B:
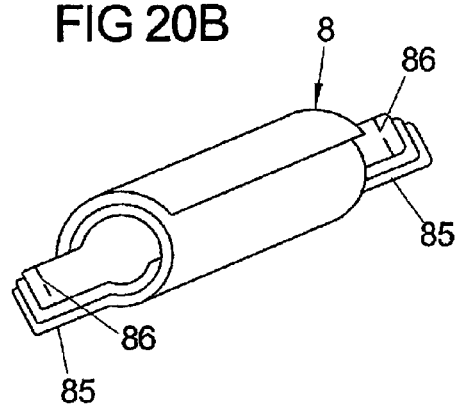

In the FIGS. 20*a* and 20*b* an embodiment of a protection layer 8 is shown; which in the wound state comprises fixation portions 85 protruding in the axial direction, to which the protection layer sleeve in the wound state can be fixed provisionally by means of tear seams 8. The connections along the tear seams 86 tear open, in case an increased gas pressure acts on the protection layer sleeve 8 of FIGS. 20*a* and 20*b* by means of gases flowing out of a gas generator. This allows for an unwinding and radial expansion of the protection layer sleeve 8 as explained by means of FIGS. 19*a* and 19*b*.

Figure 22:
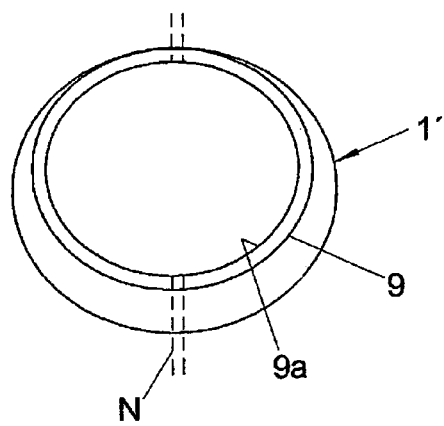
FIG. 22 shows a cross section through a connection channel of an airbag device having a fabric hose held therein having a heat resistant material layer.

Finally, a flame protection is illustrated in the FIG. 22, which is achieved by means of a fabric hose 9 arranged inside the connection region 2 (in the form of a connection channel), which is provided or coated with a heat-resistant material layer 9*a* on its inner side. This one faces a gas generator that is to be arranged inside the connection region 2.

The airbag devices described by means of the preceding Figures can be configured as non-sealed head airbag variant or also as sealed system, particularly by sealing in the region of the gas generator as described by means of FIG. 16.

For a design that is particularly suitable for production, the components of a respective construction kit can be synchronized for joining and can be configured to be manufactured with fail-safing features.

The assemblies described above can be realized in principle with all types of gas generators, like e.g., pyrotechnic, hybrid or cold gas generators.

Summarizing, the embodiments described above stand out with respect to their fastening to a motor vehicle structure using fastening flaps in that the fastening flaps consist of material parts (material layouts) being separate with respect to the inflatable regions 1*a*, 1*b* of the airbag device, which are connected to the airbag device, particularly an associated inflatable region 1*a*, 1*b* of the airbag device, via a (particularly curved) connection line. Thereby, a respective fastening flap comprises a fastening portion, via which a connection (fixing) of the respective fastening flap to a vehicle structure occurs and which is formed by turning down or reverting a free end portion of the respective fastening flap around the associated connection line (between the fastening flap and the inflatable region of the airbag device), so that it advantageously protrudes beyond a lateral boundary of the airbag device.

The respective fastening portion of a fastening flap is thereby—under permanent fixation with one end at the connection line to the airbag device and with the other end to the motor vehicle structure—under the impact of external forces, e.g. as a consequence of an inflation of the airbag device, alignable in different angle positions, namely particularly in the main plane along which the airbag device extends.

Hereby, a relative movability of the airbag device with respect to the associated connection points at a, vehicle structure is established, to which connection points the airbag device is fixed via the fastening flaps, wherein the forces acting between a respective fastening flap and the airbag device are distributed at the respective connection line between the fastening flap and the airbag device.

The priority application, German Patent Application No. 20 2007 015 431.3, filed Oct. 30, 2007 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. Airbag device for protecting a vehicle occupant in case of a crash, comprising at least one region inflatable with gas, that forms a gas cushion in an inflated state in the form of a side airbag for the vehicle occupant to be protected, at least one first material layer of the at least one inflatable region extending in front of a lateral vehicle structure of a motor vehicle in the inflated state of the airbag device, and at least one second material layer of the inflatable region that opposes the at least one first material layer in the inflated state of the airbag device, wherein at least one fastening flap is provided at the airbag device via which the airbag device can be fastened to a motor vehicle structure, wherein the at least one fastening flap is a separate element with respect to the at least one inflatable region, that is formed at least two-layered and fixed with at least each of the two layers to one of the at least one first material layer and the at least one second material layer of the at least one inflatable region via a connection line, respectively, and in that the at least two layers of the fastening flap each comprise a fastening portion, wherein each of the fastening portions comprises a free end portion folded around the connection line, wherein each of the fastening portions protrudes from the airbag device and serves for fastening the airbag device to the motor vehicle structure, and wherein the connection line runs inclined with respect to an upper edge of the inflatable region located adjacent to the at least one fastening flap or runs along a curved path.

2. The airbag device according to claim 1, wherein each of the at least one fastening flap respectively comprises at least one fastening opening that can be engaged by a fastening means for fastening to the motor vehicle structure.

3. The airbag device according to claim 1, wherein each of the at least one fastening flap is formed out of an integral material layout, which is reversed around at least one folding line for forming the at least two layers.

4. The airbag device according to claim 1, wherein each of the at least one fastening flap is fixed to the airbag device via seams.

5. The airbag device according to claim 1, wherein each of the at least one fastening flap fixed to the airbag device along the connection line is configured as a seam, which runs, with respect to the inflated state of the airbag device in which the airbag device is built into the motor vehicle, inclined with respect to an upper edge of the inflatable region located adjacent to the at least one fastening flap.

6. The airbag device according to claim 1, wherein the at least one first material layer and the at least one second material layer of the at least one inflatable region of the airbag device respectively form a component of an airbag part formed in one piece, that is folded along at least one folding line, so that the two material layers face each other, and in that the two material layers are connected to each other outside the folding line and define a region that can be inflated to form the gas cushion.

7. The airbag device according to claim 6, wherein the at least one folding line forms a symmetry axis of the airbag part in an evenly outspread state of the respective airbag part.

8. The airbag device according to claim 7, wherein the at least one fastening flap is fixed to the inflatable region in a vicinity of the folding line.

9. Airbag device for protecting a vehicle occupant in case of a crash, comprising:
  at least one region inflatable with gas, that forms a gas cushion in an inflated state in the form of a side airbag for the vehicle occupant to be protected;
  at least one first material layer of the at least one inflatable region extending in front of a lateral vehicle structure of a motor vehicle in the inflated state of the airbag device; and
  at least one second material layer of the inflatable region that opposes the at least one first material layer in the inflated state of the airbag device,
  wherein at least one fastening flap is provided at the airbag device via which the airbag device can be fastened to a motor vehicle structure,
  wherein the at least one fastening flap is a separate element with respect to the at least one inflatable region, that is formed at least two-layered and fixed with at least each of the two layers to one of the at least one first material layer and the at least one second material layer of the at least one inflatable region via a connection line, respectively, and in that the at least two layers of the fastening flap each comprise a fastening portion, folded around the connection line, that protrudes from the airbag device and serves for fastening the airbag device to the motor vehicle structure,
  wherein the connection line runs inclined with respect to an upper edge of the inflatable region located adjacent to the at least one fastening flap or runs along a curved path, and
  wherein the at least one connection line is configured as a seam, which runs along a curved path.

10. The airbag device according to claim 9, wherein the connection line extends along at least a part of a circular path.

11. The airbag device according to claim 9, wherein the connection line essentially extends in a U-shape or a V-shape.

12. The airbag device according to claim 1, wherein the fastening portion of a respective at least one fastening flap is folded around the connection line via which the respective at least one fastening flap is fixed to the airbag device, so that the fastening portion protrudes beyond an edge of the airbag device.

13. The airbag device according to claim 1, wherein the at least one fastening flap is fastened to an already folded inflatable region of the airbag device.

14. The airbag device according to claim 1, wherein the fastening portion of a respective at least one fastening flap is flexible and can move under impact of a force into a different angle position with respect to the connection line.

15. The airbag device according to claim 6, wherein the at least one folding line, with respect to a state in which the airbag device is built into the motor vehicle, extends along a lateral roof edge of the motor vehicle.

16. The airbag device according to claim 9, wherein the connection line essentially extends in a U-shape or a V-shape.

17. An airbag device for protecting a vehicle occupant in case of a crash, comprising
  at least one region inflatable with gas, that forms a gas cushion in an inflated state in the form of a side airbag for the vehicle occupant to be protected;
  at least one first material layer of the at least one inflatable region extending in front of a lateral vehicle structure of a motor vehicle in the inflated state of the airbag device; and
  at least one second material layer of the inflatable region that opposes the at least one first material layer in the inflated state of the airbag device;
  wherein at least one fastening flap is provided at the airbag device via which the airbag device can be fastened to a motor vehicle structure;
  wherein the at least one fastening flap is a separate element with respect to the at least one inflatable region, that is formed at least two-layered and fixed with at least each of the two layers to one of the at least one first material layer and the at least one second material layer of the at least one inflatable region via a connection line, respectively, and in that the at least two layers of the fastening flap each comprise a fastening portion folded around the connection line, that protrudes from the airbag device and serves for fastening the airbag device to the motor vehicle structure; and
  wherein a seam is provided along the connection line which runs along a curved path.

18. The airbag device according to claim 9, wherein the connection line extends along at least a part of a circularly shaped path.

* * * * *